(12) United States Patent
Adams et al.

(10) Patent No.: US 12,423,302 B1
(45) Date of Patent: Sep. 23, 2025

(54) HASH-JOIN BROADCAST DECISION MAKING IN DATABASE SYSTEMS

(71) Applicant: Snowflake Inc., Bozeman, MT (US)

(72) Inventors: Matthias Carl Adams, Berlin (DE); Sebastian Breß, Berlin (DE); Bjoern Daase, Berlin (DE); Moritz Eyssen, Berlin (DE); Florian Andreas Funke, Berlin (DE); Max Heimel, Berlin (DE); Georg Ortwin Otto Kissig, Amsterdam (NL)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/609,939

(22) Filed: Mar. 19, 2024

(51) Int. Cl.
*G06F 16/2453* (2019.01)
*G06F 11/34* (2006.01)
*G06F 16/2455* (2019.01)

(52) U.S. Cl.
CPC .... *G06F 16/24542* (2019.01); *G06F 11/3409* (2013.01); *G06F 16/2456* (2019.01)

(58) Field of Classification Search
CPC ........... G06F 16/24542; G06F 16/2456; G06F 11/3409
See application file for complete search history.

(56) References Cited

U.S. PATENT DOCUMENTS

| | | | | |
|---|---|---|---|---|
| 9,659,057 B2 * | 5/2017 | Tian | ................... | G06F 16/2471 |
| 12,061,603 B1 * | 8/2024 | Willems | ............ | G06F 16/24542 |
| 2019/0384845 A1 * | 12/2019 | Saxena | ............. | G06F 16/24545 |
| 2021/0073221 A1 * | 3/2021 | Chavan | ............. | G06F 16/24544 |
| 2021/0081410 A1 * | 3/2021 | Chavan | ................. | G06F 9/3888 |
| 2024/0220498 A1 * | 7/2024 | Taft | ................... | G06F 16/24542 |
| 2024/0419660 A1 * | 12/2024 | Noll | .................. | G06F 16/24524 |

OTHER PUBLICATIONS

Wikipedia, "Knapsack problem", [Online]. Retrieved from the Internet: https://en.wikipedia.org/wikiKnapsack_problem, (Accessed online Apr. 25, 2025), 9 pages.

* cited by examiner

*Primary Examiner* — Dangelino N Gortayo
(74) *Attorney, Agent, or Firm* — Schwegman Lundberg & Woessner, P.A.

(57) ABSTRACT

Provided herein are systems and methods for hash-join broadcast decision making. For example, a method includes generating a query plan for a received query. The query plan includes a plurality of join operations with a plurality of hash-join-build (HJB) operations and a plurality of hash-join-probe (HJP) operations. A decision node of a plurality of decision nodes of the query plan is configured as a primary decision node. Build-side data information associated with build-side data and received from the plurality of HJB operations is decoded by the primary decision node. A data distribution method is determined by the primary decision node for each HJB operation of the plurality of HJB operations based on the build-side data information. The query plan is executed based on distributing the build-side data to the plurality of HJP operations using the data distribution method for each HJB operation of the plurality of HJB operations.

30 Claims, 18 Drawing Sheets

| BUILD-SIDE TABLE 402 | |
|---|---|
| bKey 404 | bVal 406 |
| 42 | X |
| 11 | Y |
| 7 | Q |
| 512 | W |
| 123 | Z |

| PROBE-SIDE TABLE 410 | |
|---|---|
| pKey 412 | pVal 414 |
| 11 | e |
| 2 | a |
| 11 | o |
| 7 | i |
| 11 | u |
| 11 | b |
| 42 | d |
| 11 | h |
| 123 | g |
| 2003 | f |

| RESULT TABLE 420 WHERE bKey=pKey | | | |
|---|---|---|---|
| bKey 404 | bVal 406 | pKey 412 | pVal 414 |
| 42 | X | 42 | d |
| 11 | Y | 11 | e |
| 11 | Y | 11 | o |
| 11 | Y | 11 | u |
| 11 | Y | 11 | b |
| 11 | Y | 11 | h |
| 7 | Q | 7 | i |
| 123 | Z | 123 | g |

BEFORE BROADCAST
500

SERVER ONE 501

BUILD TABLE B.1 502

| bKey 504 | bVal 506 |
|---|---|
| 42 | X |
| 11 | Y |

PROBE TABLE P.1 510

| pKey 512 | pVal 514 |
|---|---|
| 11 | e |
| 2 | a |
| 11 | o |
| 7 | i |
| 11 | u |

SERVER TWO 521

BUILD TABLE B.2 520

| bKey 522 | bVal 524 |
|---|---|
| 7 | Q |
| 512 | W |
| 123 | Z |

PROBE TABLE P.2 530

| pKey 532 | pVal 534 |
|---|---|
| 11 | b |
| 42 | d |
| 11 | h |
| 123 | g |
| 2003 | f |

*FIG. 5*

AFTER BROADCAST OF THE BUILD SIDE
600

SERVER ONE 501

BROADCASTED BUILD TABLE 602

| bKey | bVal |
|---|---|
| 42 | X |
| 11 | Y |
| 7 | Q |
| 512 | W |
| 123 | Z |

PROBE TABLE P.1 510

| pKey | pVal |
|---|---|
| 11 | e |
| 2 | a |
| 11 | o |
| 7 | i |
| 11 | u |

SERVER TWO 521

BROADCASTED BUILD TABLE 602

| bKey | bVal |
|---|---|
| 7 | Q |
| 512 | W |
| 123 | Z |
| 42 | X |
| 11 | Y |

PROBE TABLE P.2 530

| pKey | pVal |
|---|---|
| 11 | b |
| 42 | d |
| 11 | h |
| 123 | g |
| 2003 | f |

(BUILD-SIDE ROWS ARE BROADCASTED TO EACH SERVER)

*FIG. 6*

AFTER PROBING THE PROBE SIDE
700

SERVER ONE
501

RESULT R.1 ( bKey=pKey )
702

| bKey | bVal | pKey | pVal |
|------|------|------|------|
| 11 | Y | 11 | e |
| 11 | Y | 11 | o |
| 7 | Q | 7 | i |
| 11 | Y | 11 | u |

SERVER TWO
521

RESULT R.1 ( bKey=pKey )
720

| bKey | bVal | pKey | pVal |
|------|------|------|------|
| 11 | Y | 11 | b |
| 42 | X | 42 | d |
| 11 | Y | 11 | h |
| 123 | Z | 123 | g |

FIG. 7

FINAL RESULT OF BROADCAST JOIN OPERATION
bKey=pKey

| bKey | bVal | pKey | pVal |
|------|------|------|------|
| 11   | Y    | 11   | b    |
| 42   | X    | 42   | d    |
| 11   | Y    | 11   | h    |
| 123  | Z    | 123  | g    |
| 11   | Y    | 11   | e    |
| 11   | Y    | 11   | o    |
| 7    | Q    | 7    | i    |
| 11   | Y    | 11   | u    |

BEFORE HASH PARTITIONING 900

SERVER ONE 901

BUILD TABLE B.1 902

| bKey 904 | bVal 906 |
|---|---|
| 42 | X |
| 11 | Y |

PROBE TABLE P.1 910

| pKey 912 | pVal 914 |
|---|---|
| 11 | e |
| 2 | a |
| 11 | o |
| 7 | i |
| 11 | u |

SERVER TWO 921

BUILD TABLE B.2 920

| bKey 922 | bVal 924 |
|---|---|
| 7 | Q |
| 512 | W |
| 123 | Z |

PROBE TABLE P.2 930

| pKey 932 | pVal 934 |
|---|---|
| 11 | b |
| 42 | d |
| 11 | h |
| 123 | g |
| 2003 | f |

FIG. 9

SERVER ONE 901

PARTITIONED BUILD TABLE B. 1 1002

| bKey | bVal |
|------|------|
| 42 | X |
| 512 | W |

PROBE TABLE P.1 910

| pKey | pVal |
|------|------|
| 11 | e |
| 2 | a |
| 11 | o |
| 7 | i |
| 11 | u |

*BUILD-SIDE ROWS HAVING AN EVEN-NUMBERED JOIN KEY ARE PARTITIONED TO SERVER ONE.*

SERVER TWO 921

PARTITIONED BUILD TABLE B. 2 1020

| bKey | bVal |
|------|------|
| 7 | Q |
| 123 | Z |
| 11 | Y |

PROBE TABLE P.2 930

| pKey | pVal |
|------|------|
| 11 | b |
| 42 | d |
| 11 | h |
| 123 | g |
| 2003 | f |

*BUILD-SIDE ROWS HAVING AN ODD-NUMBERED JOIN KEY ARE PARTITIONED TO SERVER TWO.*

FIG. 10

AFTER HASH PARTITIONING OF PROBE SIDE
1100

SERVER ONE 901

PARTITIONED BUILD TABLE B.1
1002

| bKey | bVal |
|---|---|
| 42 | X |
| 512 | W |

PARTITIONED PROBE TABLE P.1
1110

| pKey | pVal |
|---|---|
| 2 | a |
| 42 | d |

*PROBE-SIDE ROWS HAVING AN EVEN-NUMBERED JOIN KEY ARE PARTITIONED TO SERVER ONE.*

SERVER TWO 921

PARTITIONED BUILD TABLE B.2
1020

| bKey | bVal |
|---|---|
| 7 | Q |
| 123 | Z |
| 11 | Y |

PARTITIONED PROBE TABLE P.2
1130

| pKey | pVal |
|---|---|
| 11 | b |
| 11 | h |
| 123 | g |
| 2003 | f |
| 11 | e |
| 11 | o |
| 11 | u |

*PROBE-SIDE ROWS HAVING AN ODD-NUMBERED JOIN KEY ARE PARTITIONED TO SERVER TWO.*

*FIG. 11*

AFTER PROBING

SERVER ONE 901

RESULT R.1 1202

| bKey | bVal | pKey | pVal |
|------|------|------|------|
| 42   | X    | 42   | d    |

SERVER TWO 921

RESULT R.2 1204

| bKey | bVal | pKey | pVal |
|------|------|------|------|
| 11   | Y    | 11   | b    |
| 11   | Y    | 11   | h    |
| 11   | Y    | 11   | e    |
| 11   | Y    | 11   | o    |
| 11   | Y    | 11   | u    |
| 123  | Z    | 123  | g    |

HASH-JOIN BROADCAST DECISION MAKING IN DATABASE SYSTEMS

TECHNICAL FIELD

Embodiments of the disclosure relate generally to database query processing and, more specifically, to techniques for determining hash-join broadcast decisions in database systems.

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application program interface (API). Both computing and storage resources and their underlying architecture can play a significant role in achieving desirable database performance. Querying extensive databases and tables might require scanning and comparing large amounts of data. Reducing the amount of data scanned is one of the main challenges of data organization and processing.

BRIEF DESCRIPTION OF THE DRAWINGS

The present disclosure will be understood more fully from the detailed description given below and from the accompanying drawings of various embodiments of the disclosure.

FIG. 4 is a diagram illustrating an example join operation, in accordance with some embodiments of the present disclosure.

FIG. 5 is a diagram illustrating an example join operation, in accordance with some embodiments of the present disclosure.

FIG. 6 is a diagram illustrating an example join operation, in accordance with some embodiments of the present disclosure.

FIG. 7 is a diagram illustrating an example join operation, in accordance with some embodiments of the present disclosure.

FIG. 8 is a diagram illustrating an example join operation, in accordance with some embodiments of the present disclosure.

FIG. 9 is a diagram illustrating an example join operation, in accordance with some embodiments of the present disclosure.

FIG. 10 is a diagram illustrating an example join operation, in accordance with some embodiments of the present disclosure.

FIG. 11 is a diagram illustrating an example join operation, in accordance with some embodiments of the present disclosure.

FIG. 12 is a diagram illustrating an example join operation, in accordance with some embodiments of the present disclosure.

DETAILED DESCRIPTION

Figure 1:
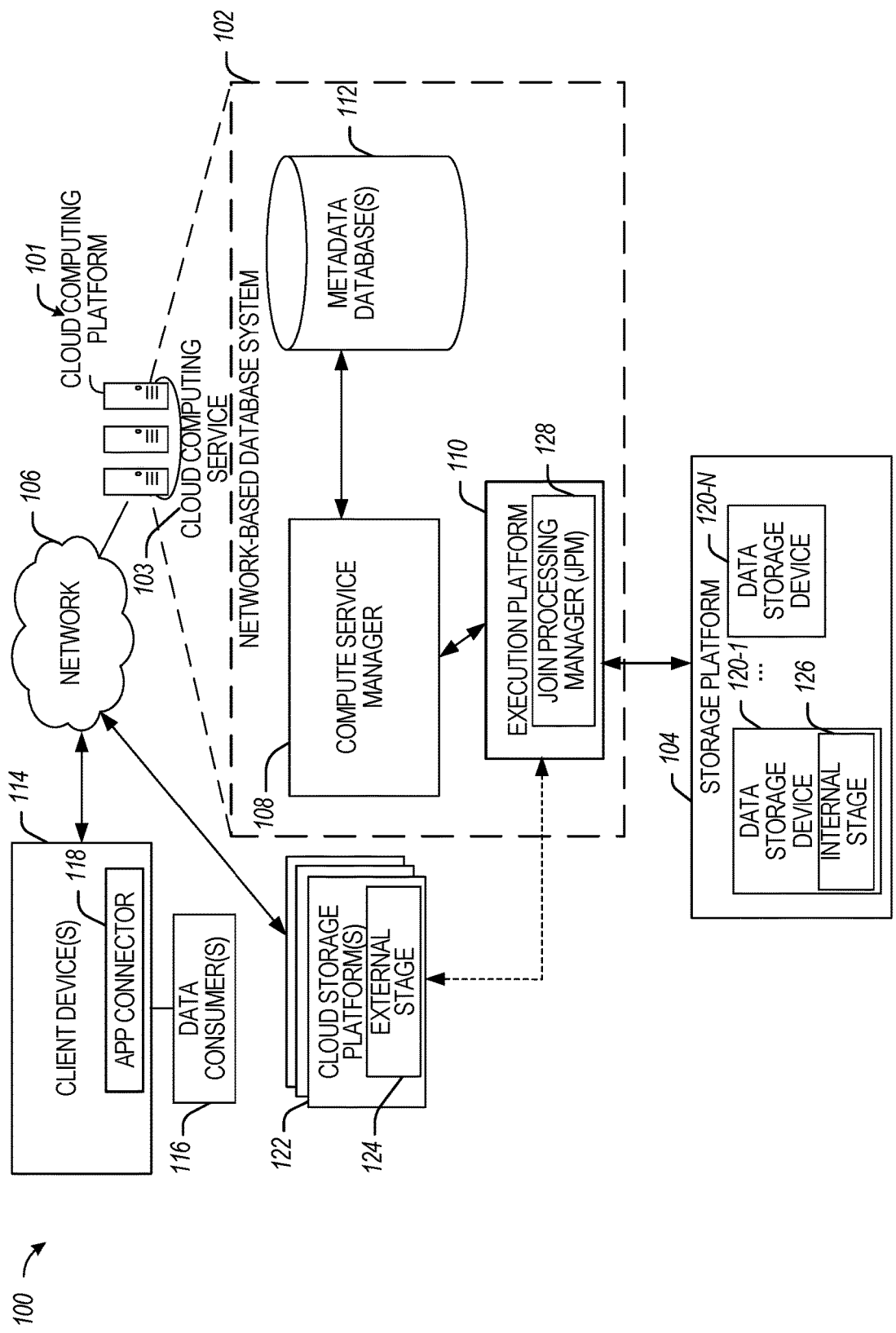
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and the like. If stored internally in the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "pipeline" refers to a sequence of connected row set operators (RSOs) that starts/ends in a leaf operator (e.g., a TableScan (TS) operator, an ExternalScan operator, a RowGenerator operator, an EPScan operator, etc.), a pipeline breaker (e.g., a Buffer, a Parent Aggregation, a Sort, a PartitionOrderBy, etc.), or in a result operator. In some aspects, RSOs in a pipeline can be connected via redistributing links or other types of links.

In some aspects, a join operation may be conducted on database data and cause columns from one or more database tables to be merged. Relational databases are often normalized to eliminate duplication of information, such as when an entity type may have one-to-many relationships with a plurality of other entity types. A join operation may be utilized to join entity types according to certain join predicates.

A join operation may be utilized in response to a database query to return the appropriate entity types that are requested in the query. In some aspects, a join is an operation in query processing that determines rows in two input streams that "match" with respect to some of their attributes. In some examples, those attributes are referred to as join keys. Join operations are typically very time-consuming operations during query execution. An example of a join operation includes an SQL join clause for combining columns from one or more tables in a relational database. In other aspects, a join can be represented without an explicit join clause (e.g., cartesian or cross joins). The join clause is a means for combining columns from one or more tables by using values common to each of the one or more tables or non-matching values (e.g., in the case of anti-joins or outer joins). In some aspects, (distributed) hash joins can be used for join processing.

In some aspects, each join consists of two RSOs-a hash-join-build (HJB) operator and a hash-join-probe (HJP) operator. Execution of HJB and HJP operators can be configured as instances on a network node. The HJB instance is configured to receive hash-partitioned build-side data and communicate the data to the HJP instance (e.g., broadcast to all HJP instances in case of a broadcast join operation or perform a local synchronization to the HJP instance in case of a hash-hash join operation). In some aspects, the HJB instance builds bloom vectors for bloom filters in the processing plan, creates the data streams that are to be sent to the HJP instance, and determines whether the probe side processing can be canceled if the build side is empty.

In some aspects, each HJB RSO is executed in a separate pipeline (also referred to as the build pipeline) since an HJB is a pipeline breaker. In some aspects, consecutive HJP RSOs can be combined into a probe pipeline. In some aspects, before scheduling a probe pipeline, all associated build pipelines accessed by the probe pipeline finish their execution.

A hash join is an example of a join algorithm that may be used in the implementation of a relational database management system. Various forms of hash joins are commonly used in database systems to compute the result of a join. Hash joins build one or more multiple hash tables with rows of one of the inputs (typically the smaller input) referred to as the "build-side" input. The rows are probed from the other input (typically the larger input), referred to as the "probe-side" input, and into the hash tables. In massively parallel database systems with N servers, two distribution strategies are often distinguished: broadcast joins, and hash-hash joins (hash-hash joins are also commonly referred to as shuffle joins or "hash-partitioning hash joins").

A broadcast join is an example of a join algorithm where a single side of the data to be joined is sent to a plurality of workers (e.g., nodes or servers). At the end of the HJB operator inside the terminate function, the build-side rows are sent to the corresponding probe operator on all nodes. In the probe RSO, zero or more hash tables are built on the build-side rows so that the hash tables can be probed locally on each instance. In some aspects, a broadcast can include changing the RSO links (e.g., the build-side link of the HJP operator can be set to BROADCAST, and the probe-side link can be set to LOCAL_SYNCHRONOUS). Broadcast joins are efficient when the build-side input fits into the main memory of a single server. Broadcast joins distribute all rows of the build-side to all N servers and then partition the probe-side over the servers so that each server of the N servers receives only a fraction of the probe-side input. Each of the N servers probes its partition into its copy of the hash table(s) that includes all data from the build-side input.

For a hash-hash join, its corresponding HJP instance on all other nodes/servers is configured to receive the hash-partitioned build-side data as well as hash-partitioned probe-side data and complete the join operation. In this regard, the HJP instance can build the hash tables when receiving the first probe-side data.

Hash-hash joins are often employed where the build-side input does not fit into the main memory of a single server. Hash-hash joins are configured to hash-partition the build-side input across all N servers and then hash-partition the probe-side input with the same partitioning function. In a hash-hash join, each server of the N servers probes its fraction of the probe-side input into its fraction of the build-side. The partitions can be built and probed locally on each instance. In this case, the build-side link and probe-side link of the HJP operator can be set to HASH. The partitioning function ensures that if a row from probe partition PPi has matches on the build side, those matches are in the build partition BPi. This strives to equal utilization of all N participating servers during the probe phase of the hash-hash join if the partitioning function partitions the probe input into N partitions of equal size.

In some aspects, an execution platform in a database system decides on whether to apply a broadcast or a repartition join strategy for each join individually. The disclosed techniques can take properties such as row counts and the global memory consumption of the active hash build operators into account and enable broadcast joins for a subset of hash build operators that do not exceed a memory budget (e.g., a pre-configured memory utilization threshold).

In some aspects, a greedy strategy can be used to keep a pipeline-wide variable that stores the total memory of all active hash tables. In this case, hash build operators are sequentially executed one after another, and the cumulative size of all local hash tables is locally stored. When sending the hash table sizes to a primary processing node, the hash table sizes of previous hash build operators are added. This way, the primary processing node will obtain the aggregated size of all local hash tables that previous hash build operators created. As soon as the global size exceeds the memory limit for broadcast joins, the primary processing node can decide on the hash-hash join strategy instead of a broadcast join.

The disclosed techniques include hash-join broadcast decision-making that considers all hash joins of the same probe pipeline together instead of considering each join individually. In this regard, the disclosed techniques consider the global memory consumption of the HJB data distribution strategy, making the strategy decision more robust against accidental out-of-memory (OOM) errors for large right-deep join trees (i.e., joins with a large probe pipeline).

In some aspects, the disclosed techniques can be used to configure a join processing manager (JPM) to perform hash-join broadcast decision-making when executing a query plan including one or more joins. In some aspects, the JPM can configure a new RSO (e.g., a broadcast decision operator) to handle the decision logic and pull the existing decision logic out of the HJB operator. In some aspects, the JPM can identify join clusters in a query plan based on pipeline annotations and inject a new operator (e.g., a broadcast decision operator, also referred to as a decision operator, decision node, or decision instance) between each HJB-HJP operator pair. The decision operator performs the holistic join broadcast decision based on one or more decision strategies.

The various embodiments that are described herein are described with reference, where appropriate, to one or more of the various figures. An example computing environment using a join processing manager (JPM) for hash-join broadcast decision-making is discussed in connection with FIGS. 1-3. Example join operations are discussed in connection with FIGS. 4-14. Example functionalities of the JPM for hash-join broadcast decision-making are further discussed in connection with FIGS. 15-17. A more detailed discussion of example computing devices that may be used in connection with the disclosed techniques is provided in connection with FIG. 18.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with the network-based database system 102, storage platforms 104, and cloud storage platforms 122. The cloud computing platform 101 provides computing resources and storage resources that may be acquired (purchased) or leased (e.g., by data providers and data consumers) and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the hash-join broadcast decision-making functions described herein). The cloud computing platform 101 may include a three-tier architecture: data storage (e.g., storage platforms 104 and 122), an execution platform 110, and a compute service manager 108 providing cloud services. In some embodiments, the execution platform 110 is configured to provide services associated with hash-join broadcast decision-making using a JPM 128.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and files of one or more other types—on, as examples, one or more of their servers and on one or more cloud-storage platforms such as AMAZON WEB SERVICES™ (AWS™), MICROSOFT® AZURE®, GOOGLE CLOUD PLATFORM™, and the like. The customer's servers and cloud-storage platforms are both examples of what a given customer could use as what is referred to herein as an external storage location. The cloud computing platform 101 could also use a cloud-storage platform, which is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations. Internal files can be stored in internal stages at one or more internal storage locations, which can include servers managed and controlled by the same organization (e.g., company) that manages and controls the data platform and which can instead or in addition include data storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources, including one or more storage locations within the cloud storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed hash-join broadcast decision-making functions) to multiple client accounts, including an account of the data provider associated with client device 114 and an account of the data consumer 116. In some embodiments, the execution platform 110 comprises the JPM 128, which can be used in connection with hash-join broadcast decision-making functions. Example hash-join broadcast decision-making functions include configuring a decision operator for each HJB-HJP operator pair and using the disclosed decision strategies to determine a build-side data distribution method (e.g., whether to perform a broadcast join or a hash-hash join distribution). A more detailed description of the functions provided by the JPM 128 is provided in connection with, e.g., FIGS. 15-17.

The compute service manager 108 coordinates and manages operations of the network-based database system 102. The compute service manager 108 also performs query optimization and compilation and manages clusters of computing services that provide computing resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed hash-join broadcast decision-making functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., hash-join broadcast decision-making functions) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, metadata database 112, execution platform 110, and storage platform 104 are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operations, the network-based database system 102 processes multiple jobs as determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from and store data to any of the data storage resources in the cloud storage platform 104.

Figure 2:
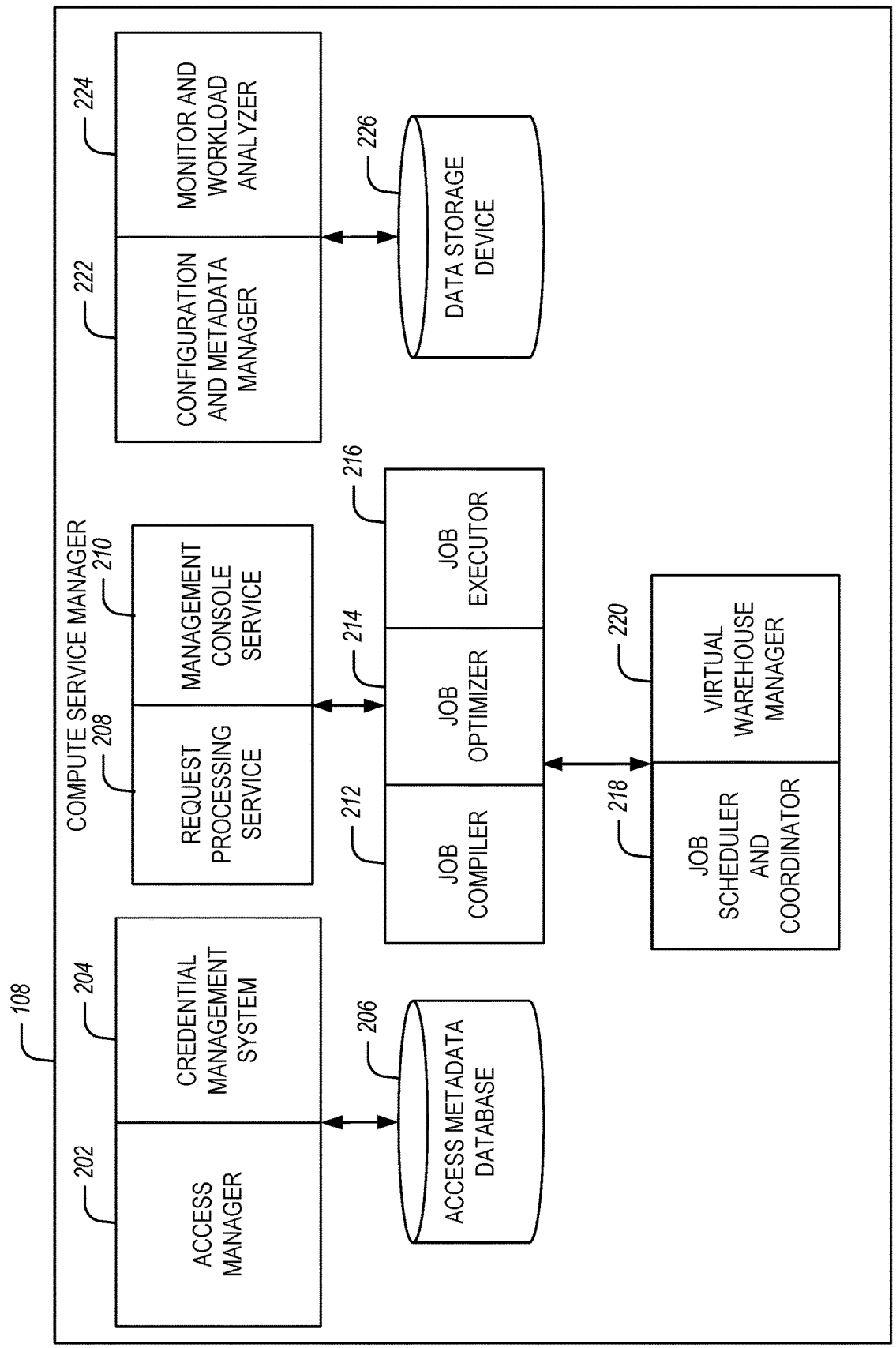
FIG. 2 is a block diagram illustrating the components of a compute service manager, in accordance with some embodiments of the present disclosure.

FIG. 2 is a block diagram illustrating the components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources, such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports administrators and other system managers' access to various systems and processes. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

Figure 3:
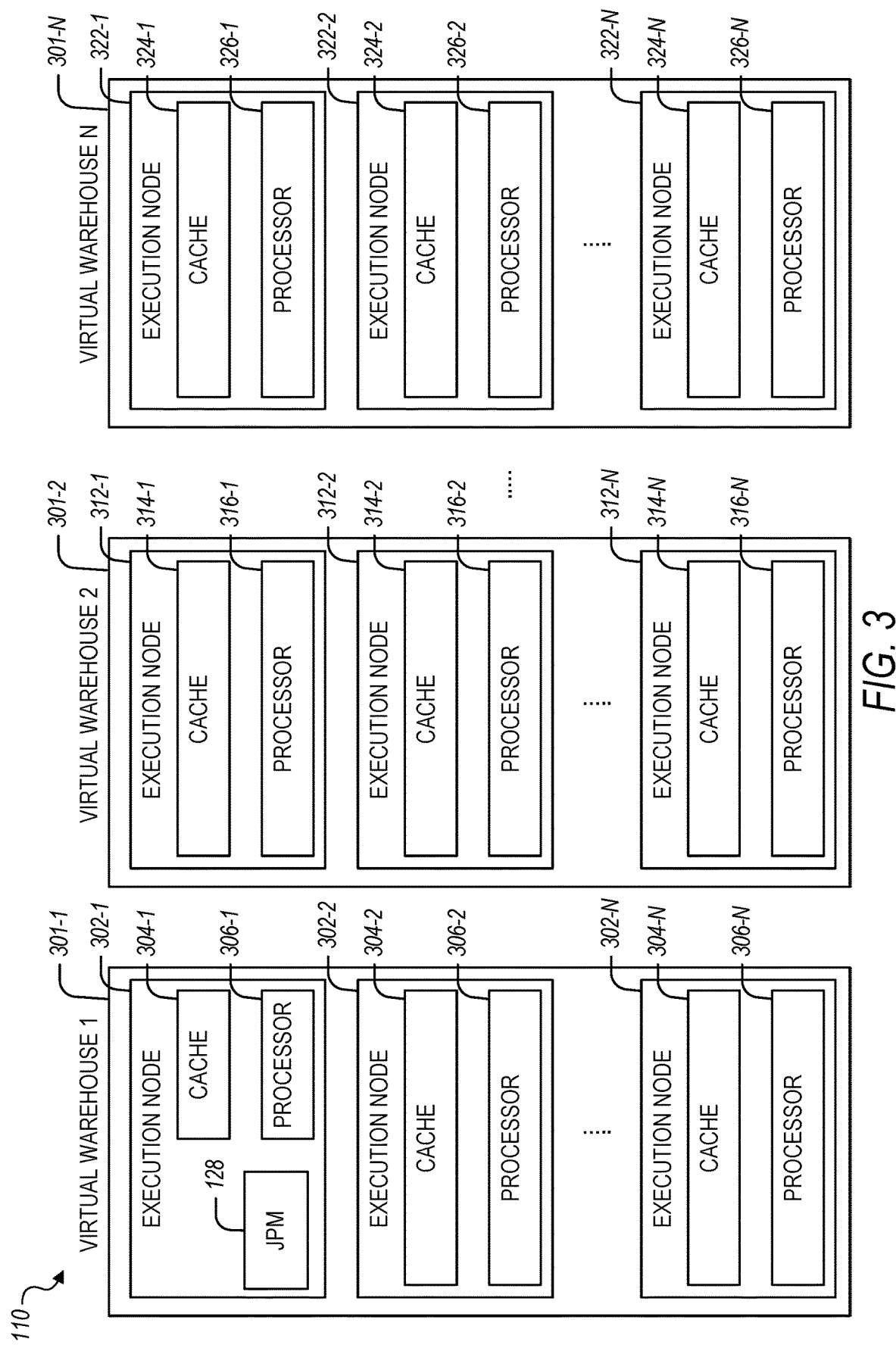
FIG. 3 is a block diagram illustrating components of an execution platform with a join processing manager (JPM), in accordance with some embodiments of the present disclosure.

FIG. 3 is a block diagram illustrating components of the execution platform 110 with a JPM, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, they can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device. Still, the virtual warehouse or execution node may later access data from any other data storage device.

In the example of FIG. 3, virtual warehouse 1 includes three execution nodes: 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes. This is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, which is helpful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , and N may be implemented using multiple computing systems at multiple geographic locations. For example, virtual warehouse 1 can be implemented by a computing system at a first geographic location, while another computing system implements virtual warehouses 2 and n at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and caching resources are needed. Similarly, existing virtual warehouses may be deleted when the resources associated with the virtual warehouse are no longer necessary.

In some embodiments, the virtual warehouses may operate on the same data in the cloud storage platform 104. Still, each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

In some embodiments, the execution platform 110 further includes the JPM 128, which can be used in connection with hash-join broadcast decision-making functions disclosed herein. For example, and as illustrated in FIG. 3, the JPM 128 is implemented in execution node 302-1. Even though the JPM 128 is illustrated as a separate module within the execution platform 110, the disclosure is not limited in this regard, and other configurations of the JPM 128 can be used as well. For example, one or more of the functionalities of the JPM 128 can be implemented as stand-alone modules in one or more servers of the compute service manager 108.

The following description of FIGS. 4-12 provides details regarding inner joins. FIG. 4 illustrates an example join operation 400. The join operation 400 results in the result table 420 are constructed based on a join operation to the build-side table 402 and the probe-side table 410. The build-side table 402 is smaller than the probe-side table 410, as illustrated in FIG. 4. The build-side table includes two attributes (columns), including bKey 404 and bVal 406. The probe-side table 410 further includes two attributes, pKey 412 and pVal 414. The result table 420 indicates the result of the join operation 400 wherein bKey 404 is equal to pKey 412. The join operation 400 pairs up every row from the build-side table 402 with every row from the probe-side table 410 and then eliminates those rows where the attribute bKey 404 does not match the attribute pKey 412. In a hash join operation, the smaller table (in this case, the build-side table 402) will be called the "build side," and the larger table (in this case, the probe-side table 410) will be called the "probe side." The order in which rows are depicted in any of the tables is not relevant. It should be appreciated that the systems and methods of the disclosure may be implemented where the build-side table is not the smaller table but is instead the larger table.

As an example, as illustrated in FIG. 4, there is a bKey 404 value equal to "42" that is associated with the bVal 406 value "X." Additionally, there is a pKey 412 value "42" that is associated with the pVal 414 value "d." As illustrated in the result table 420 where bKey is equal to pKey, the bKey 404 value of "42" is matched with the pKey 412 value of "42," returning bVal 406 and pVal 414 values of "X" and "d," respectively.

As illustrated in FIG. 4, where there is a build-side key value (bKey 404) in the build-side table 402 that is not represented as a probe-side key value (pKey 412) in the probe-side table 410, any rows including that value do not appear in the result table 420. Similarly, where there is a probe-side key value (pKey 412) in the probe-side table 410 that is not represented as a build-side key value (bKey 404) in the build-side table 402, any row including that value is not included in the result table 420. An example of such a row in the build-side table 402 is [512, W] because the "512" key is not represented in the probe-side table 410. Examples of such rows in the probe-side table 410 include [2, a] and [2003, f] because the "2" key and the "2003" key are not represented in the build-side table 402.

FIGS. 5-8 illustrate data tables representing steps associated with a broadcast join operation. FIG. 5 illustrates an example set of tables for a join in a parallel database system, wherein FIG. 5 illustrates the tables before broadcast 500. In a parallel database system with multiple servers, data may be structured as illustrated in FIG. 5 before the join operation. Any number of servers may be involved in a broadcast join operation, and the figures herein illustrate two servers for simplicity in illustrating the join operation.

Each server, including server one 501 and server two 521, has a build-side table (also referred to as a build table) and a probe-side table (also referred to as a probe table). Server one 501 includes a build table B.1 502 and a probe table P.1 510. Server two 521 includes a build table B.2 520 and a probe table P.2 530. The build table B.1 502 includes bKey 504 keys and bVal 506 values, and the probe table P.1 510 includes pKey 512 values and pVal 514 values. The build table B.2 520 includes bKey 522 values and bVal 524 values, and the probe table P.2 530 includes pKey 532 values and pVal 534 values. An issue, as illustrated in FIG. 5, is that server one 501 includes some rows (see, e.g. [42, X]) that need to be joined with one or multiple rows of a probe table that reside on a different server (see, e.g. [42, d] located on server two 521). To perform the join, the tables need to be repartitioned or redistributed in a way that allows efficient computation of the join operation. Depending on the size of the build table (typically the smaller table), this can be achieved via a broadcast join operation or a hash-hash join operation.

In an embodiment, FIG. 5 illustrates a broadcast join with the assumption that the combination of build table B.1 502 and build table B.2 520 is small enough to fit into the memory of a single server. The build side is broadcasted to ensure that every server has all the rows of each of build table B.1 502 and build table B.2 520. Afterward, each server can probe the subset of a probe table (e.g., probe table P.1 510 or probe table P.2 530) that it owns against the hash table to find matches.

FIG. 6 illustrates the same overall table values as illustrated in FIG. 5 but after the broadcast of the build side 600 of the join operation. As illustrated in FIG. 6, after the broadcast of the build side 600, each server (e.g., server one 501 and server two 521) includes a complete copy of the broadcasted build table 602. The broadcasted build table 602 includes all values of the build-side of the join operation, including values stored in build table B.1 502 and build table B.2 520. The probe side of the join operation (e.g., probe table P.1 510 and probe table P.2 530) is not altered by the broadcasting of the build side to each server.

FIG. 7 illustrates the same overall table values as illustrated in FIGS. 5-6, but after probing the probe-side 700 of the join operation such that the final result of the join operation is illustrated. Server one 501 has generated a result R.1 702. Server two 521 has generated a result R.2 720. The union of result R.1 702 and result R.2 720 provides the final result. Each server (e.g., server one 501 and server two 521) probes its subset of the probe-side table (e.g., probe table P.1 510 and probe table P.2 530) into the broadcasted build table 602. It should be appreciated that the broadcasted build table 602 may alternatively be referred to as the hash table. Thus, each server computes a part of the result, and the combined results of all servers yield the correct overall result of the join.

FIG. 8 illustrates the final result 800 of the broadcast join operation computed based on the table values illustrated in FIGS. 5-7. The final result 800 includes bKey and bVal values initially found in the build side of the join operation. The final result 800 further includes pKey and pVal values initially found on the probe side of the join operation. The final result 800 is the union of result R.1 702 and result R.2 720, which were determined after probing the probe side of the join.

FIGS. 9-11 illustrate data tables representing various steps of a hash-hash join operation. Applicant notes that FIGS. 9-11 include the same overall table values as illustrated in FIGS. 5-8 for simplicity in illustrating differences between a broadcast join and a hash-hash join. A hash-hash join is commonly implemented where the totality of the build-side comprises too much data to fit into the main memory of a single server. Both the build-side data and the probe-side data are hash-partitioned or redistributed to break up the total work into equal parts. For simplicity, FIGS. 9-11 illustrate a simple hash-partitioning function that will send each row where a join key is an even number to server one 901 and send each row where a join key is an odd number to server two 921. During the build phase of the join, each server will hash-partition every row of the build side (see build table B.1 902 and build table B.2 920). The probe-side is then redistributed according to the same hash function. Each server can thus compute its part of the result locally.

FIG. 9 illustrates data tables on server one 901 and server two 921 before hash partitioning 900. Thus, FIG. 9 may represent the original data stored on one or more remote servers before a join operation is commenced. It should be appreciated that any number of servers may be involved in a hash-hash join, and the figures herein illustrate two servers for simplicity. Server one 901 includes a build table B.1 902 having bKey 904 values and bVal 906 values. Server one 901 further includes a probe table P.1 910 having pKey 912 and pVal 914 values. Server two 921 includes a build table B.2 920 having bKey 922 values and bVal 924 values. Server two 921 further includes a probe table P.2 930 having pKey 932 values and pVal 934 values.

The key values (see bKey 904, pKey 912, bKey 922, and pKey 932) constitute join keys. The join keys indicate how a match may be made between data stored on the build side of the join and data stored on the probe side of the join. That is, the final result of the join operation mandates that the bKey values match the pKey values. Where a build-side join key corresponds with, i.e., matches, a probe-side join key, the build-side row, and the probe-side row may be joined.

FIG. 10 illustrates the same overall table values as in FIG. 9 after hash partitioning of the build side 1000. FIG. 10 illustrates the result of the build phase of the join operation. During the build phase of the join operation, each server hash-partitions each row of the build side (e.g., build table B.1 902 and build table B.2 920) to generate new partitioned build tables (e.g., partitioned build table B.1 902 and partitioned build table B.2 920). The probe-side tables remain the same (e.g., probe table P.1 910 and probe table P.2 930). Server one 901 includes partitioned build table B.1 1002 and probe table P.1 910. Server two 921 includes partitioned build table B.2 1020 and probe table P.2 930.

For simplicity, a simple hash-partitioning function is used in an embodiment as illustrated in FIG. 10 such that each build-side row having an even-numbered join key (see bKey 904 and bKey 922) is sent to server one 901 and each build-side row having an odd-numbered join key (see bKey 904 and bKey 922) is sent to server two 921. During the build phase of the join operation, each server will hash-partition every row of the build side. For example, server one 901 will keep row [42, X] of build table B.1 902 because the join key (42) is an even number. Server one 901 will send row [11, Y] to server two 921 because the join key (11) is an odd number. Server two 921 will send row [512, Z] to server one 901 because the join key (512) is an even number. Server two will keep rows [7, Q] and [123, Z] because the join keys (7 and 123) are odd numbers.

FIG. 11 illustrates the same overall table values as in FIGS. 9-10 after hash partitioning of the probe-side 1100. The probe-side (e.g., probe table P.1 910 and probe table P.2 930) is redistributed according to the same hash function used with respect to the build side as illustrated in FIG. 10. That is, probe-side rows having an even-numbered join key are partitioned to server one 901, and probe-side rows having an odd-numbered join key are partitioned to server two 921. As illustrated in FIG. 11, the partitioned probe table P.1 1110 on server one 901 includes rows having an even-numbered join key including [2, a] and [42, d]. The partitioned probe table P.2 1130 on server two 921 includes rows having an odd-numbered join key including [11, b], [11, h], [123, g], [2003, f], [11, e], [11, o], and [11, u]. As such, each server can compute its part of the join result locally.

In an embodiment, the results of the partitioned probe data (e.g., partitioned probe table P.1 1110 and partitioned probe table P.2 1130) are not stored on the respective servers after the probe-side data has been partitioned. Instead, the partitioned probe data is streamed through a server such that each probe data row either remains on the current server or is transmitted to a remote server. Either way, the probe data row is immediately probed into the hash table (e.g., the respective partitioned build table) and matched with one or more rows of the build side. The resulting rows are transmitted to the next operator of the query execution logic.

FIG. 12 illustrates the partitioned result 1200 after probing the partitioned probe data (e.g., partitioned probe table P.1 1110 and partitioned probe table P.2 1130) into the partitioned build data (e.g., partitioned build table B.1 1002 and partitioned build table B.2 1020). Server one 901 returns result R.1 1202, and server two 921 returns result R.2 1204. The final result of the hash-hash join operation includes the union of result R.1 1202 and result R.2 1204. As such, the final result of the hash-hash join operation is computed locally by one or more servers, and the individual results of each of the individual servers are combined to generate the final result.

As illustrated in FIG. 12, the partitioned result 1200 includes data skew characterized by server two 921 having more data than server one 901. Result R.2 1204 includes many more rows of data than result R.1 1202. This is caused by the presence of more rows having an odd-numbered join key than rows having an even-numbered join key, which is also referred to as probe-side data skew. In an embodiment, as illustrated in FIG. 12, server two 921 would take much longer to finish its part of the join operation work.

In some embodiments, build-side data (e.g., build-side row sets, also referred to as build-side rows) are partitioned based on their hash values. If there exists value skew (e.g., most build-side rows have the same hash value), the build-side rows would all be partitioned to the same worker (e.g., server), resulting in build-side skew, which can be mitigated (or prevented) by configuring more than one instance (e.g., a hash-join-build or HJB instance) to process hashed build-side data (e.g., redistributing the workload among multiple instances) and achieve better build-side workload balance with minimal overhead.

Figure 13:
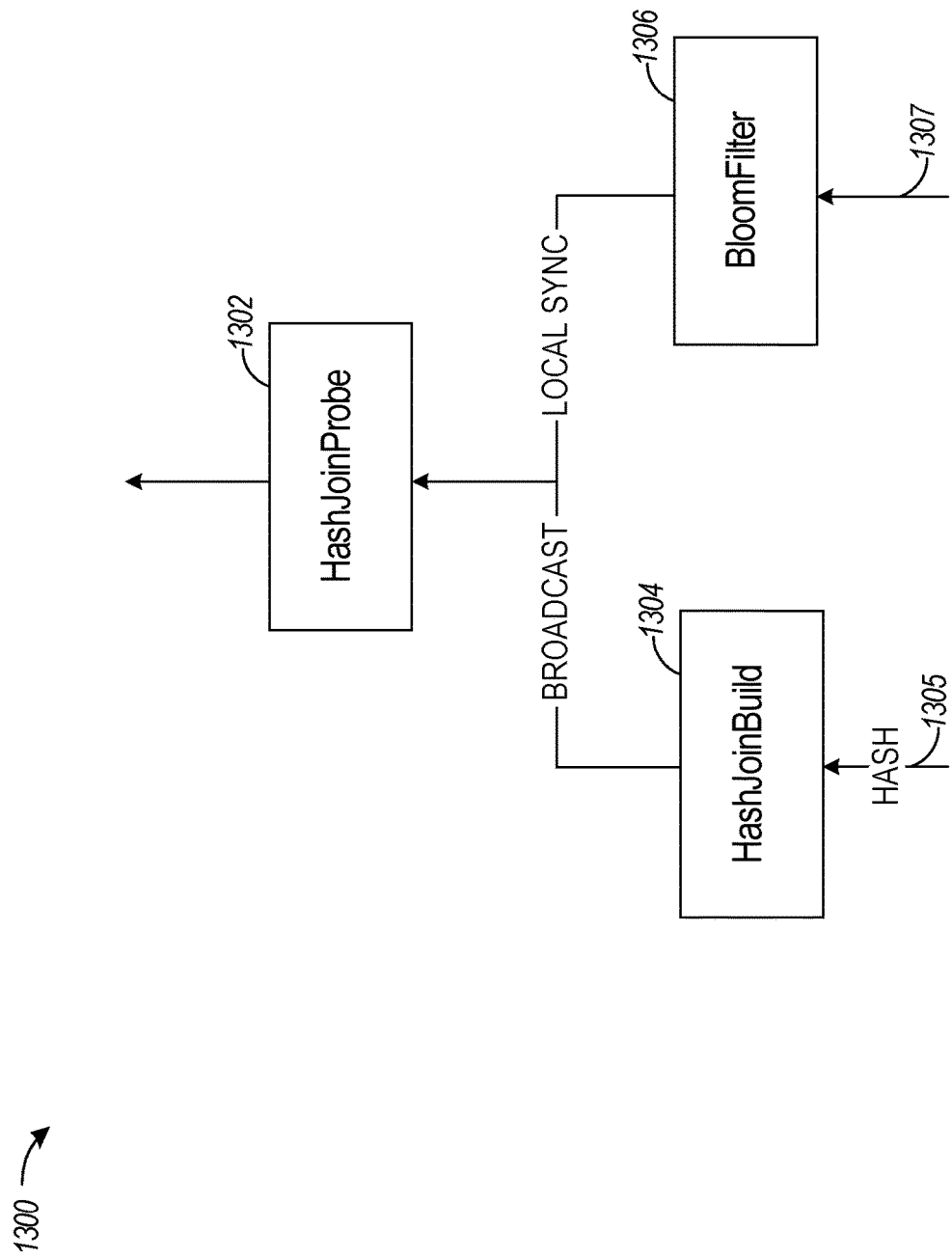
FIG. 13 is a diagram illustrating an example broadcast join operation, in accordance with some embodiments of the present disclosure.

FIG. 13 is a schematic diagram illustrating an example broadcast join operation 1300, in accordance with some embodiments of the present disclosure. FIG. 13 illustrates the build side of the broadcast join operation 1300, including an HJB instance 1304 receiving hashed build-side data 1305 from a hash link producer. The probe side of the broadcast join operation includes a filter (e.g., a Bloom filter) 1306 (or any arbitrary operator such as a TableScan) receiving probe-side data 1307, which is filtered and communicated to (e.g., synchronized to) the HJP instance 1302. The HJP instance 1302 receives the build-side data from the HJB instance 1304 (e.g., via broadcast) and completes the join operation using the build-side data and the probe-side data.

At the incoming link of the HJB instance 1304, rows are distributed by hash so that each HJB instance gets a different slice of data. When the HJB instance 1304 terminates, it decides if it should broadcast all data or not based on the total number of hashed build-side rows. This decision determines whether the hash join operation is executing as a broadcast join or a hash-partitioning hash join (or hash-hash join). In broadcast joins (e.g., as illustrated in FIG. 13), a local instance i of HJB (e.g., HJB instance 1304) will send what the build-side data it has to the instance i of HJP (e.g., HJP instance 1302) in all joint operation processes. The probe-side rows (e.g., the filtered probe-side data 1307) are passed to the local HJP instance (e.g., HJP instance 1302) synchronously.

Figure 14:
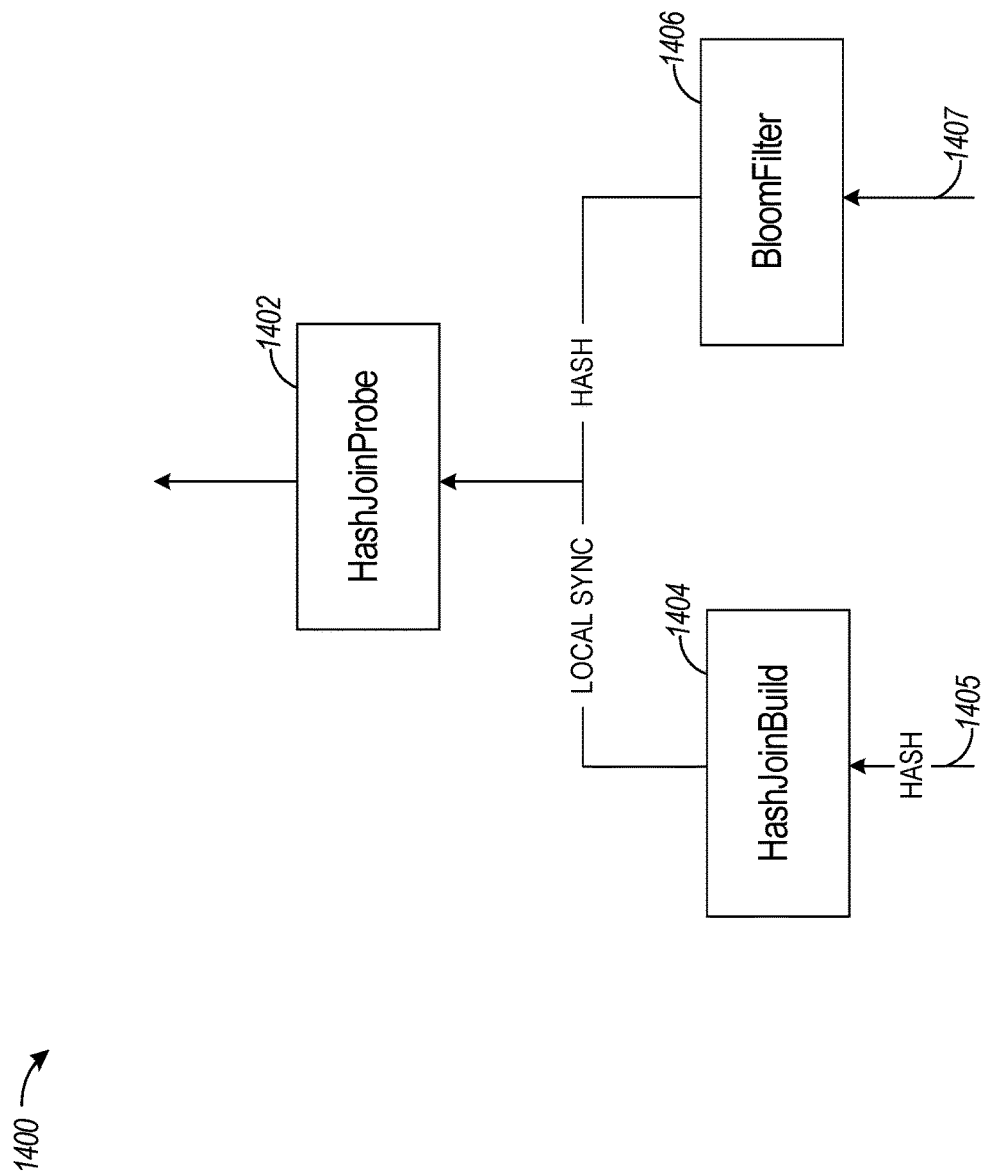
FIG. 14 is a diagram illustrating an example hash-hash join operation, in accordance with some embodiments of the present disclosure.
Figure 16:
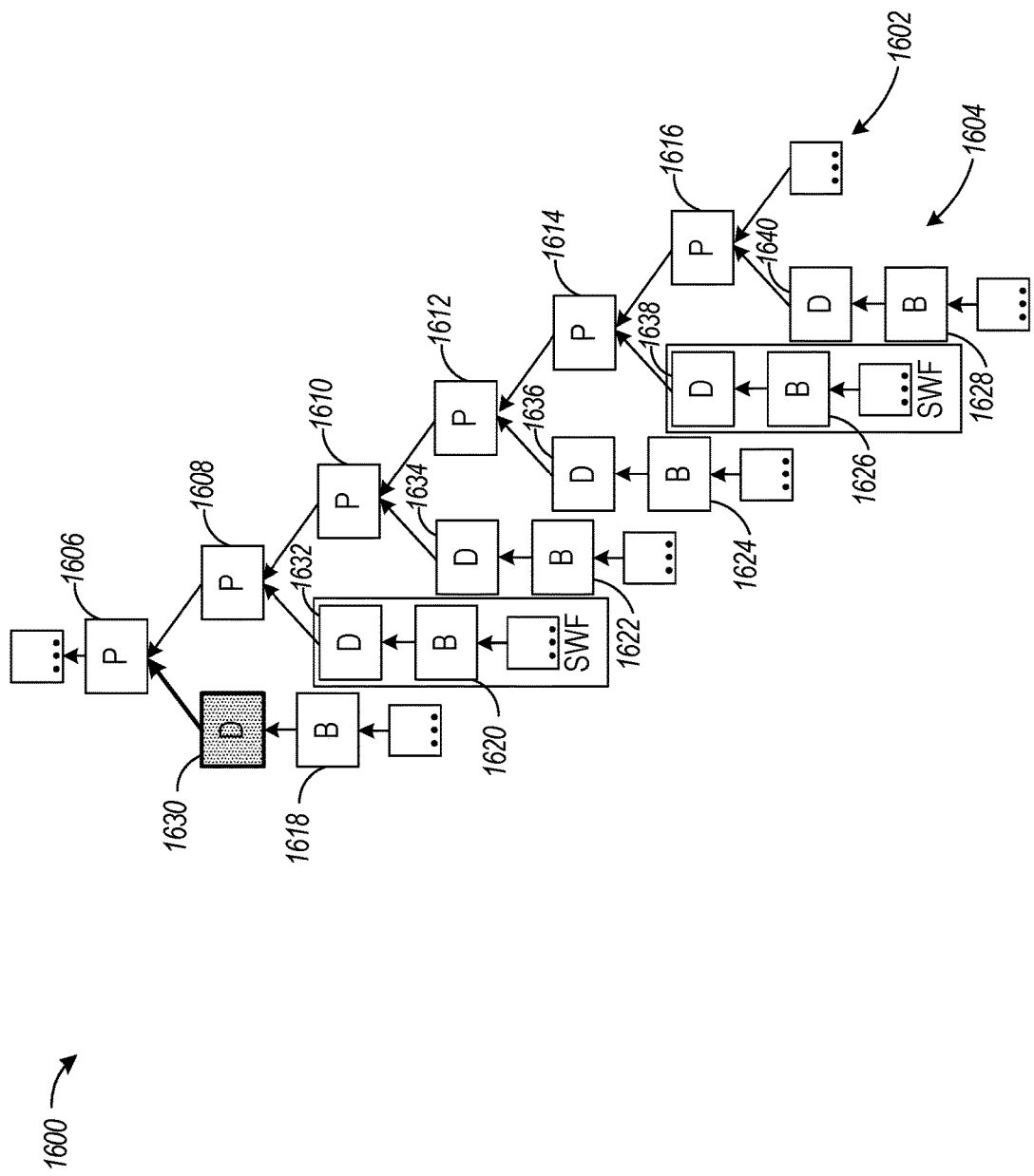
FIG. 16 is a diagram illustrating the processing of a query execution plan with multiple joins using hash-join decision operators, in accordance with some embodiments of the present disclosure.

FIG. 14 is a schematic diagram illustrating an example hash-hash join operation 1400, in accordance with some embodiments of the present disclosure. FIG. 14 illustrates the build side of the hash-hash join operation 1400 includes an HJB instance 1404 receiving hashed build-side data 1405 from a hash link producer (e.g., example hash link producers are illustrated in FIG. 16). The probe side of the hash-hash join operation includes a filter (e.g., a Bloom filter) 1406 receiving probe-side data 1407, which is filtered, hashed, and communicated to the HJP instance 1402. The HJP instance 1402 receives the hashed build-side data from the HJB instance 1404 (e.g., via a local synchronization) and completes the hash-hash join operation using the hashed build-side data and the hashed probe-side data.

In some embodiments, each of the instances discussed herein (as well as any hash link producers that perform the data hashing or hash partitioning) can be configured to execute on a separate worker node (or server). In other embodiments, multiple instances can execute on the same server.

If row data is not broadcast in the HJB instance, the hash-hash join operation 1400 is performed, with each worker node (or server) processing a different hash partition. In this case, a local instance i of HJB (e.g., HJB instance 1404) will only pass what it has to the local instance i of HJP (e.g., HJP instance 1402) in the same process. On the probe-side, probe-side rows are hash partitioned across multiple instances.

In some aspects, a local broadcast decision is configured to estimate the hash table size of the current build RSO and the build-side rows broadcast when the estimated memory footprint is below a memory utilization threshold. This approach can be used to make an informed decision at query run-time when the size of the build side is known. In some aspects, this approach can be configured when the compiler decides to leave the decision to runtime (e.g., the link between the HJB and HJP operators is BROADCAST_ADAPTIVE). However, this approach may not take into account the memory spent on earlier hash tables that were broadcasted or any other RSO using the memory. In this regard, the approach may result in overcommitting memory and experiencing OOM incidents for long probe pipelines or complex join plans, which extends the processing time as the entire query has to be re-executed. Additionally, smaller memory budgets can be used for the retried run, which can result in more conservative decisions and slower plan execution.

Figure 15:
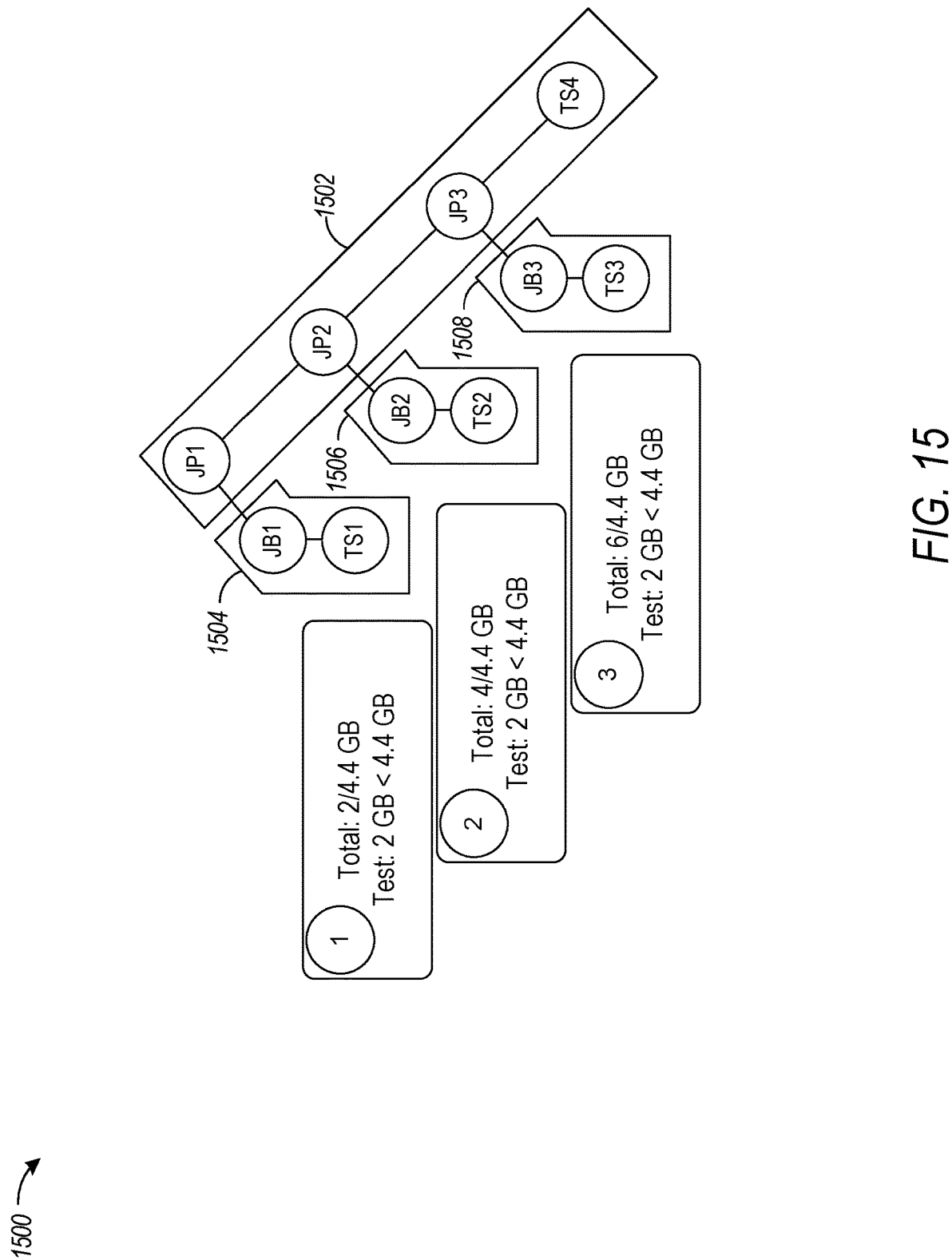
FIG. 15 is a diagram illustrating the processing of a query execution plan with three joins, in accordance with some embodiments of the present disclosure.

FIG. 15 is a diagram 1500 illustrating the processing of a query execution plan with three joins, in accordance with some embodiments of the present disclosure. Referring to FIG. 15, diagram 1500 illustrates a query with three joins formed by join build (JB) operators (e.g., JB1, JB2, and JB3) and join probe (JP) operators (e.g., JP1, JP2, and JP3). The three build operators, JB1, JB2, and JB3, are in corresponding build pipelines 1504, 1506, and 1508, including corresponding table scan (TS) operations TS1, TS2, and TS3. The probe operators JP1-JP3 are in probe pipeline 1502, which also includes TS4.

In the example presented by FIG. 15, each hash table consumes 2 GB of memory, and there is a memory limit (e.g., memory utilization threshold) of 4.4 GB.

In operation, the first build pipeline 1504 is executed by scheduling RSO TS1. When terminating the hash join build (e.g., JB1), a broadcast strategy is selected, and the build-side rows are communicated to the corresponding hash join probe RSO (e.g., JP1). The total consumed memory is now 2 GB out of 4.4 GB.

Processing continues by starting the second build pipeline 1506 by scheduling TS2. A broadcast strategy is selected again as the current build RSO (e.g., JB2) again needs 2 GB of memory, which is smaller than the limit of 4.4 GB. In this case, the consumed memory of the hash table of JB1 is not considered. The total consumed memory is now 4 GB out of 4.4 GB.

In a subsequent processing operation, the third build pipeline 1508 is initiated by scheduling TS3. A broadcast strategy is selected again as the current build RSO (e.g., JB3) again needs 2 GB of memory, which is smaller than the limit of 4.4 GB. In this case, the consumed memory of the hash tables of JB1 and JB2 are not considered. The total consumed memory is now 6 GB out of 4.4 GB and exceeds the memory budget, which results in an OOM incident.

The above-described query processing of FIG. 15 is based on performing an RSO-local decision of the join strategy without considering the decisions of other join operators. When multiple joins are present in a query plan, a chain of probe operators ("probe pipeline") can be created, where a large table is read once, and the probe operations are performed on the hash tables of all build sides. However, this query processing technique can result in the following inefficiencies:

(a) Processing runs out of memory for large join plans where a broadcast strategy is continuously selected until the memory is fully occupied.

(b) The order in which the decision for the join strategy is made (e.g., starting from the top join in the query plan) can be inefficient because the most selective, and thus probably computationally most expensive joins, are the first (lowest) joins in a chain of probe RSOs in the query plan. However, the build-side data distribution decisions in FIG. 15 start from the latest (top-most) probe in the probe chain first since this is the RSO that gets scheduled first.

(c) There is no mechanism to defer a decision to the point where all build nodes have finished but before the probe pipeline starts, which makes it challenging to make a global broadcast decision for all active joins at the same time.

The disclosed techniques (e.g., discussed below and in connection with FIGS. 16-17) are based on introducing a new RSO (e.g., a hash join decision node) that sits between each build and probe node (the hash join decision node is also referred to as a decision node or a decision operator). Multiple of these RSOs will form a decision group, for which a holistic decision can be made on whether to broadcast or hash-hash join for each join. This will be a holistic decision because all build nodes in the pipeline can be executed (e.g., via scheduling) before the first RSO decision operator is executed, which ensures that all relevant information of all joins (e.g., memory utilization by all joins) is available.

FIG. 16 is a diagram 1600 illustrating the processing of a query execution plan with multiple joins using hash-join decision operators, in accordance with some embodiments of the present disclosure. Referring to FIG. 16, the query execution plan includes a probe pipeline 1602 (e.g., formed by probe operators 1606, 1608, 1610, 1612, 1614, and 1616) and a plurality of build pipelines 1604 (e.g., individual build pipelines associated with build operators 1618, 1620, 1622, 1624, 1626, and 1628).

As illustrated in FIG. 16, a decision operator is inserted (e.g., by JPM 128) between each hash-join-build and hash-join-probe pair as a parent of the build operator and the left-hand child of the probe operator. For example, decision operators 1630, 1632, 1634, 1636, 1638, and 1640 are inserted between corresponding probe operators (e.g., probe operators 1606, 1608, 1610, 1612, 1614, and 1616) and corresponding build operators (e.g., build operators 1618, 1620, 1622, 1624, 1626, and 1628).

In some aspects, the decision operator takes over some of the build operator's responsibilities, namely the distribution of the collected build-side rows to the probe operator, and it can also decide which distribution methods to use. The build operator continues to be responsible for collecting the build-side rows and building bloom vectors for filter operators in the probe pipeline, which are scheduled at a later time. Furthermore, the build operator continues to broadcast bloom vectors to the parent RSO. During termination, the build node can locally hand over the collected build rows to the decision operator instead of sending them to the probe operator.

In some aspects, the link between the build and decision operators can be a BLOOM_ASYNCHRONOUS link in order to accommodate the broadcasting of bloom vectors. In some aspects, the link between the decision and the probe operator can be one of the following:

(a) a BLOOM_ASYNCHRONOUS link for fixed hash-hash-joins;

(b) a BROADCAST link for fixed broadcast joins; and (c) a BROADCAST_ADAPTIVE link for when the decision is up to the operator.

In some aspects, JPM 128 can configure an exception for a single worker fragment (SWF), which is described herein below.

In some aspects, SWFs refer to plan fragments that are small enough to be executed by a single process. For SWFs, the JPM 128 can consider a decision node part of the decision group if it is a root of the SWF, and no holistic decisions can be made for these decision nodes as they will have to broadcast. However, the disclosed techniques take into account the memory requirements associated with SWFs. The link between the build and decision operator associated with an SWF can be configured as BROADCAST.

Since decision nodes are introduced before the JPM 128 identifies SWFs, joins that are entirely part of the SWF will also have decision nodes (e.g., decision operators 1632 and 1638 in FIG. 16). For these joins, the JPM can configure the distribution method to BROADCAST to ensure that, e.g., bloom vector distribution works as expected. In some aspects, the link between the decision and probe node within the SWF will remain LOCAL_SYNCHRONOUS.

In some aspects, JPM 128 can configure the execution plan so that an HJB operator is the child of an HJP operator.

As used herein, the term "decision group" indicates a grouping of all decision nodes that belong to a single probe chain, where the entire decision group has at least one decision node that is not part of a SWF. In reference to FIG. 16, a decision group can include decision operators 1630, 1632, 1634, 1636, 1638, and 1640.

In some aspects, JPM 128 can configure the decision group with at least one decision node that acts as the primary decision node (or primary decision operator), which will decide the join strategy for all joins belonging to its decision group. The master decision node may not be a part of a SWF. During compilation, JPM 128 can add scheduling dependencies among the decision groups' operators that enforce the following configurations:
  (a) Build operators run before the primary decision operator.
  (b) Decision operators that are an SWF root run before the primary decision operator.
  (c) Non-master decision operators that are not part of an SWF run after the primary decision operator.

The above configurations ensure that all hash table sizes are known before making the first adaptive join strategy decision in the group.

In some aspects, JPM 128 can split members of the decision group into the following two categories:
  (a) Active members, for which the primary decision node needs to decide on the distribution method. This subset consists of the decision operators targeting the same probe pipeline; they are not part of an SWF and have an adaptive join strategy.
  (b) Passive members, for which the primary decision node will not make a decision. This subset consists of decision operators targeting the same probe pipeline; they are part of a SWF or have a fixed join strategy. Additionally, the sizes of the hash tables can be taken into consideration during the group's holistic join broadcast decision.

In some aspects, JPM 128 selects the decision operator associated with the top HJB-HJP operator pair in the execution plan as the primary decision operator. For example, JPM 128 can configure decision operator 1630 as the primary decision operator.

In some aspects, JPM 128 can configure the timeline for processing data within the probe pipeline 1602 to include 4 phases, which are described below.

In the first phase, JPM 128 executes all build RSOs of that pipeline (e.g., build operators 1618, 1620, 1622, 1624, 1626, and 1628) without the corresponding decision nodes, except for SWFs, which will also evaluate the decision node. Build operators continue to build the row streams, the bloom vectors proceed, and the first build barrier is performed. In some aspects, the bloom vectors will be distributed to the respective bloom filter nodes, and the row streams will be forwarded through the decision node to the probe node to build the hash tables. A synchronization point is then configured, which ensures the relevant information is available on all servers.

In the second phase, JPM 128 can execute the primary decision node (e.g., decision operator 1630), which, during its termination, will make decisions based on the information (e.g., build-side data information) already gathered in the first build barrier. In some aspects, the build-side data information associated with build-side data can include one or more of the following: required memory of the rows, required memory of the hash table, the number of build rows per instance, minimum free memory on a worker, and whether the execution plan is being processed under memory pressure (e.g., a certain threshold of available memory is already used, etc.).

In a first pass, JPM 128 can make decisions on data distribution methods (e.g., whether broadcast join or hash-hash join is used) based on the following example configurations (which can be considered in the following order):
  (a) Fixed distribution methods;
  (b) Empty build decisions;
  (c) Memory pressure decisions; and
  (d) Adaptive cartesian join decisions.

In some aspects, JPM 128 can make decisions on data distribution methods based on other considerations as well.

Afterward, the remaining undecided adaptive joins can be decided by the JPM 128 using a holistic join broadcast decision strategy, which is described below.

In this phase, the primary decision operator receives the build-side data information from the build operators and makes a determination (e.g., using one or more of the decision strategies below) on the distribution method that each build operator can use.

In phase 3, the remaining decision operators (e.g., the non-primary decision nodes/operators) consider their now-settled join strategy during termination (e.g., as indicated by the primary decision operator) and, depending on it, broadcast or locally send their collected rows to the probe operator.

In phase 4, JPM 128 can initiate probing in the probe pipeline 1602.

In some aspects, JPM 128 can utilize the following decision strategies (e.g., at the primary decision operator) to determine a distribution method for the build-side data available at each of the build operators.

In some aspects, JPM 128 can configure the primary decision node to perform first-pass decisions and then make decisions for the remaining joins.

In some aspects, the primary decision operator can make the following decisions (in the indicated order below) as first-pass decisions:
  (a) Fixed distribution methods. For any join that is part of an SWF (root or not), the primary decision operator can decide for BROADCAST as the build-side data distribution method. For all remaining joins where the compiler decided that the distribution method shall be fixed, the same BROADCAST decision can be used as well.
  (b) Empty build decisions. In case the build side of a join is empty (e.g., no rows are present during runtime) and the join type would cause an empty result of the join (e.g., inner join), the primary decision operator can decide for BROADCAST as the build-side data distribution method.
  (c) Memory pressure decisions. The primary decision operator can consider the current query to be under memory pressure whenever a memory manager indicates that the used managed memory is larger than a pre-configured threshold (e.g., a memory limit). If decision-making is in this state, the primary decision operator may not commit to any BROADCAST joins and thus force a HASH distribution.

(d) Adaptive cartesian join decision. For cartesian joins, the primary decision operator can force a HASH distribution when the required memory exceeds the available physical memory.

In some aspects, after the primary decision node performs the above first-pass decisions, subsequent decisions for a data distribution method for the remaining joins can be performed based on the following holistic join broadcast decision strategies described below (or other decision strategies).

(a) Legacy-Decision Strategy. The primary decision operator can behave as a hash-join-build logic (however, the decision is now made in the primary decision node instead of the build node). Additionally, the primary decision operator makes the build-side data distribution decision for all joins in the pipeline, which allows more sophisticated usage tracking for deciding which distribution strategy to use as well as possibly changing the strategy back to this on a retry.

(b) Always-Hash-Hash Strategy. In some aspects, every join can be configured to use a hash-hash distribution. This strategy can be used primarily for testing purposes.

(c) Always Broadcast Strategy. In some aspects, every join can be configured to use a broadcast distribution. This strategy can be used primarily for testing purposes.

(d) Simple-Budget-Based-Greedy-Heuristic Strategy. In some aspects, JPM 128 configures the primary decision operator to configure the build nodes for broadcasting as many hash tables as possible with the sum of the broadcasted hash table sizes remaining in the budget. For example, the primary decision operator can select build operators for broadcast distribution until the total used memory for the distribution of build-side data for such build operators is at or below a pre-configured threshold (e.g., a memory utilization threshold).

In some aspects, under this strategy, joins deeper in the query plan (e.g., joins with higher RSO IDs) are decided first (e.g., join of build operator 1628), under the assumption that these will be the most expensive and critical joins.

(e) Exponential Broadcast Threshold Backoff Strategy. In some aspects, the primary decision operator can configure broadcast for as many joins as possible based on the following configurations:

(e.1) Introduce a threshold X.

(e.2) For each node in the decision group, estimate the memory consumption m and check whether m<X. If yes, add it to a set N.

(e.3) Compute the total memory consumption: sum (N).

(e.4) If sum (N)<X, the primary decision operator can decide to broadcast hash tables in set N, and processing concludes. Else, X is decreased by a factor k (e.g., 0.7): X=X*k, and processing continues at step (e.1).

Possible optimizations for this strategy include the following: sort the nodes in N by memory consumption, always broadcast tiny hash tables (<1 KB or 10 rows), and consider parallel running queries on a compute warehouse (e.g., automatically adjust the memory budget depending on which queries are executing in parallel).

Figure 17:
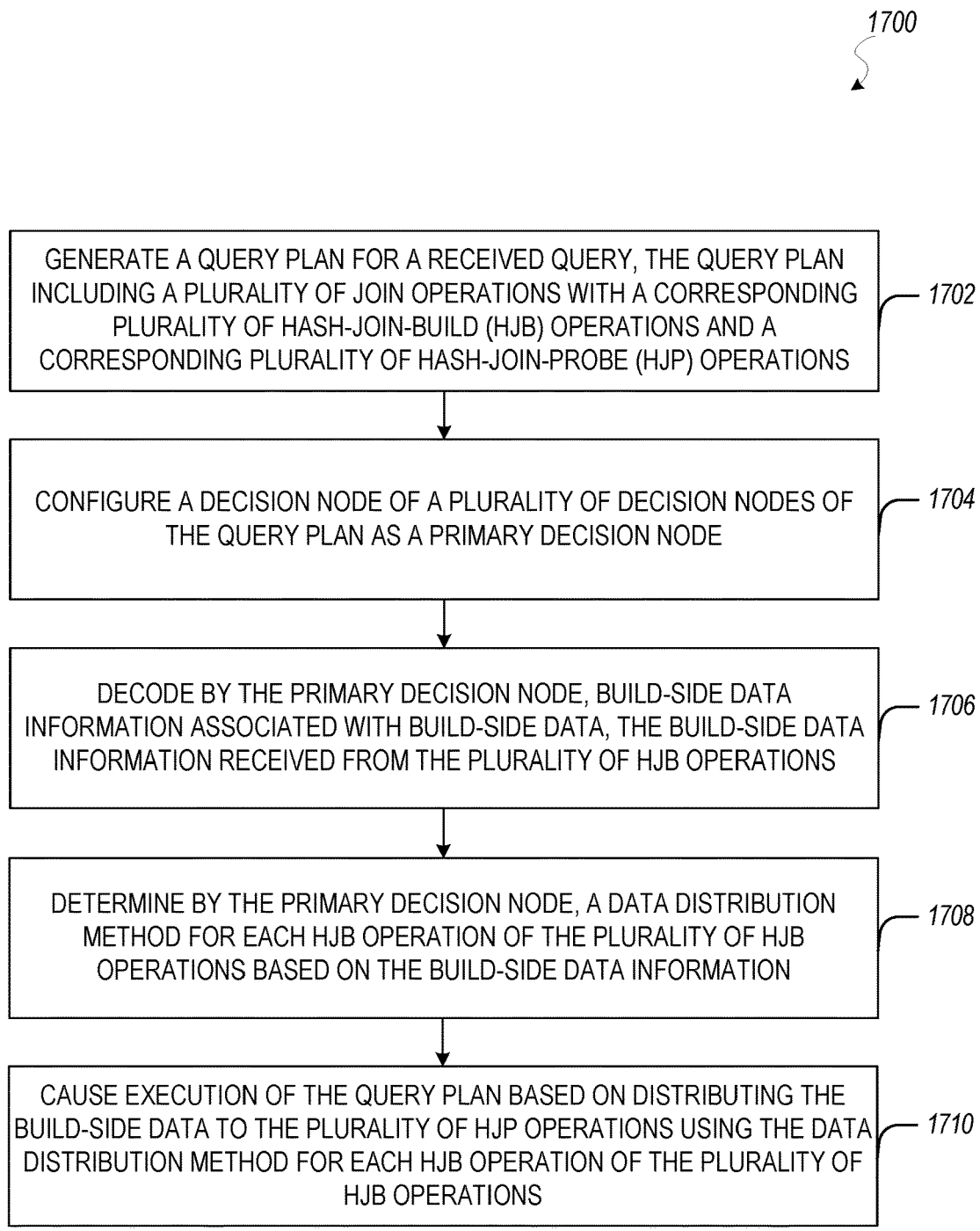
FIG. 17 is a flow diagram illustrating the operations of a database system in performing a method for hash-join broadcast decision-making in accordance with some embodiments of the present disclosure.

FIG. 17 is a flow diagram illustrating the operations of a database system in performing method 1700 for hash-join broadcast decision-making, in accordance with some embodiments of the present disclosure. Method 1700 may be embodied in computer-readable instructions for execution by one or more hardware components (e.g., one or more processors) such that the operations of method 1700 may be performed by components of network-based database system 102, such as components of the execution platform 110 (e.g., the JPM 128) and/or the compute service manager 108 (which components may be implemented as machine 1800 of FIG. 18). Accordingly, method 1700 is described below, by way of example with reference thereto. However, it should be noted that method 1700 may be deployed on various other hardware configurations and is not intended to be limited to deployment within the network-based database system 102.

At operation 1702, a query plan (e.g., the query plan in FIG. 16) is generated for a received query. The query plan can include a plurality of join operations, including a plurality of hash-join-build (HJB) operations (e.g., build operators 1618, 1620, 1622, 1624, 1626, and 1628) and a plurality of hash-join-probe (HJP) operations (e.g., probe operators 1606, 1608, 1610, 1612, 1614, and 1616).

At operation 1704, a decision node of a plurality of decision nodes of the query plan is configured as a primary decision node. For example, decision operator 1630 is configured as the primary decision operator (also referred to as the primary decision node).

At operation 1706, build-side data information associated with build-side data is decoded by the primary decision node. For example, primary decision operator 1630 receives build-side data information from the plurality of HJB operations.

At operation 1708, a data distribution method for each HJB operation of the plurality of HJB operations is determined by the primary decision node based on the build-side data information.

At operation 1710, the query plan is executed based on distributing the build-side data to the plurality of HJP operations using the data distribution method for each HJB operation of the plurality of HJB operations.

Figure 18:
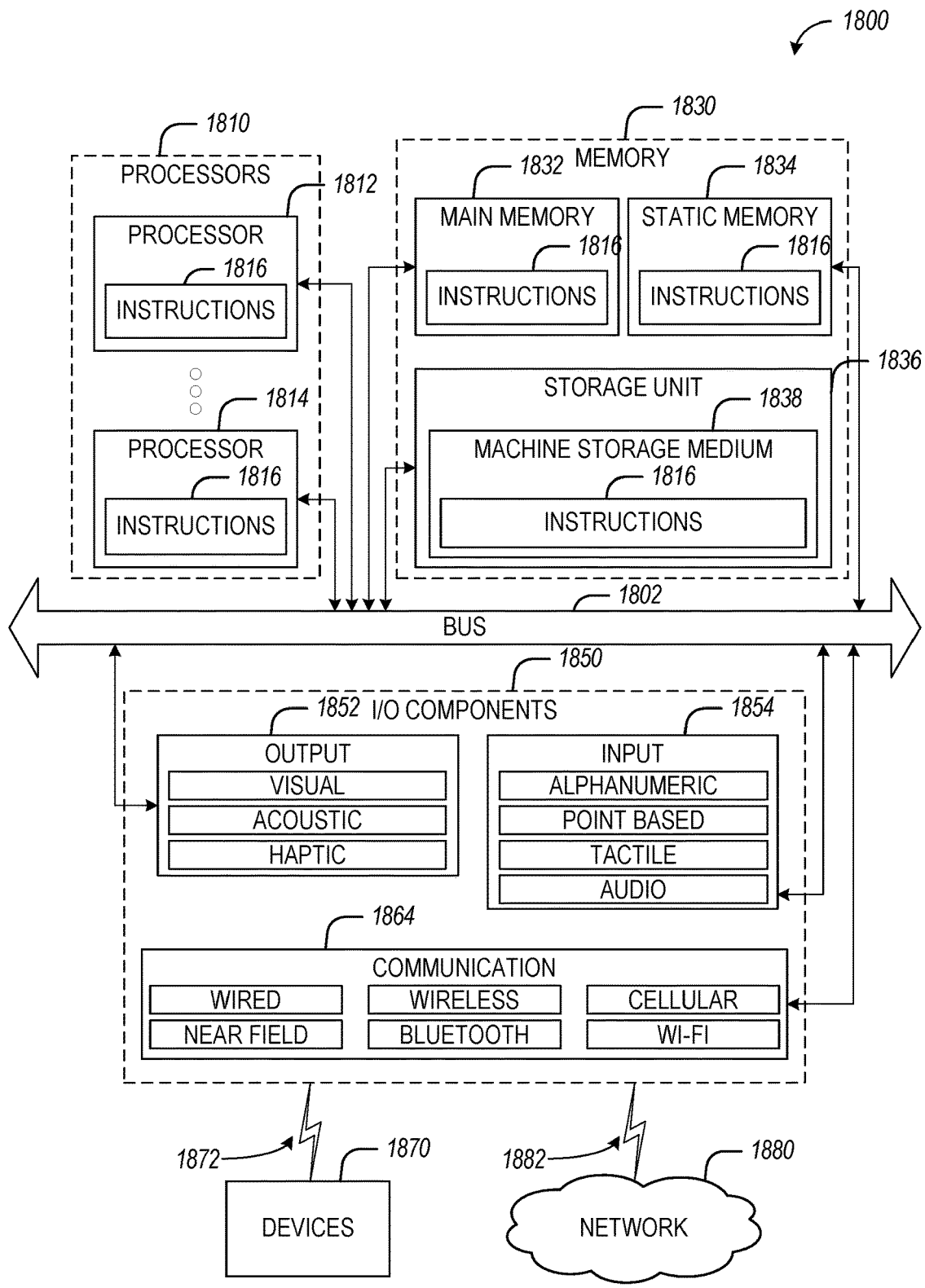
FIG. 18 illustrates a diagrammatic representation of a machine in the form of a computer system within which a set of instructions may be executed for causing the machine to perform any one or more of the methodologies discussed herein, in accordance with some embodiments of the present disclosure.

FIG. 18 illustrates a diagrammatic representation of machine 1800 in the form of a computer system within which a set of instructions may be executed for causing machine 1800 to perform any one or more of the methodologies discussed herein, according to an example embodiment. Specifically, FIG. 18 shows a diagrammatic representation of the machine 1800 in the example form of a computer system, within which instructions 1816 (e.g., software, a program, an application, an applet, an app, or other executable code) for causing the machine 1800 to perform any one or more of the methodologies discussed herein may be executed. For example, instructions 1816 may cause machine 1800 to execute any one or more operations of method 1700 (or any other technique discussed herein, for example, in connection with FIG. 4-FIG. 17). As another example, instructions 1816 may cause machine 1800 to implement one or more portions of the functionalities discussed herein. In this way, instructions 1816 may transform a general, non-programmed machine into a particular machine 1800 (e.g., the compute service manager 108 or a node in the execution platform 110) that is specially configured to carry out any one of the described and illustrated functions in the manner described herein. In yet another embodiment, instructions 1816 may configure the compute service manager 108 and/or a node in the execution platform 110 to carry out any one of the described and illustrated functions in the manner described herein.

In alternative embodiments, the machine 1800 operates as a standalone device or may be coupled (e.g., networked) to other machines. In a networked deployment, machine 1800 may operate in the capacity of a server machine or a client machine in a server-client network environment or as a peer machine in a peer-to-peer (or distributed) network environment. The machine 1800 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1816, sequentially or otherwise, that specify actions to be taken by the machine 1800. Further, while only a single machine 1800 is illustrated, the term "machine" shall also be taken to include a collection of machines 1800 that individually or jointly execute the instructions 1816 to perform any one or more of the methodologies discussed herein.

Machine 1800 includes processors 1810, memory 1830, and input/output (I/O) components 1850 configured to communicate with each other such as via a bus 1802. In some example embodiments, the processors 1810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1812 and a processor 1814 that may execute the instructions 1816. The term "processor" is intended to include multi-core processors 1810 that may comprise two or more independent processors (sometimes referred to as "cores") that may execute instructions 1816 contemporaneously. Although FIG. 18 shows multiple processors 1810, the machine 1800 may include a single processor with a single core, a single processor with multiple cores (e.g., a multi-core processor), multiple processors with a single core, multiple processors with multiple cores, or any combination thereof.

The memory 1830 may include a main memory 1832, a static memory 1834, and a storage unit 1836, all accessible to the processors 1810, such as via the bus 1802. The main memory 1832, the static memory 1834, and the storage unit 1836 store the instructions 1816, which embody any one or more of the methodologies or functions described herein. The instructions 1816 may also reside, wholly or partially, within the main memory 1832, within the static memory 1834, within machine storage medium 1838 of the storage unit 1836, within at least one of the processors 1810 (e.g., within the processor's cache memory), or any suitable combination thereof, during execution thereof by the machine 1800.

The I/O components 1850 include components to receive input, provide output, produce output, transmit information, exchange information, capture measurements, and so on. The specific I/O components 1850 that are included in a particular machine 1800 will depend on the type of machine. For example, portable machines such as mobile phones will likely include a touch input device or other such input mechanisms, while a headless server machine will likely not include such a touch input device. It would be appreciated that the I/O components 1850 may include many other components that are not shown in FIG. 18. The I/O components 1850 are grouped according to functionality merely to simplify the following discussion, and the grouping is in no way limiting. In various example embodiments, the I/O components 1850 may include output components 1852 and input components 1854. The output components 1852 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1850 may include communication components 1864 operable to couple the machine 1800 to a network 1880 or devices 1870 via a coupling 1882 and a coupling 1872, respectively. For example, the communication components 1864 may include a network interface component or another suitable device to interface with the network 1880. In further examples, communication components 1864 may include wired communication components, wireless communication components, cellular communication components, and other communication components to provide communication via other modalities. The device 1870 may be another machine or any of a wide variety of peripheral devices (e.g., a peripheral device coupled via a universal serial bus (USB)). For example, as noted above, machine 1800 may correspond to any one of the compute service manager 108 or the execution platform 110, and device 1870 may include the client device 114 or any other computing device described herein as being in communication with the network-based database system 102 or the cloud storage platform 104.

The various memories (e.g., 1830, 1832, 1834, and/or memory of the processor(s) 1810 and/or the storage unit 1836) may store one or more sets of instructions 1816 and data structures (e.g., software) embodying or utilized by any one or more of the methodologies or functions described herein. These instructions 1816, when executed by the processor(s) 1810, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1880 or a portion of network 1880 may include a wireless or cellular network, and the coupling 1882 may be a Code Division Multiple Access (CDMA) connection, a Global System for Mobile communications (GSM) connection, or another cellular or wireless coupling. In this example, the coupling 1882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1816 may be transmitted or received over network 1880 using a transmission medium via a network interface device (e.g., a network interface component included in the communication components 1864) and utilizing any one of several well-known transfer protocols (e.g., hypertext transfer protocol (HTTP)). Similarly, instructions 1816 may be transmitted or received using a transmission medium via coupling 1872 (e.g., a peer-to-peer coupling) to device 1870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1816 for execution by the machine 1800 and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some aspects, the processor or processors may be located in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a system comprising: at least one hardware processor; and at least one memory storing instructions that cause the at least one hardware processor to perform operations comprising: generating a query plan for a received query, the query plan comprising a plurality of join operations including a plurality of hash-join-build (HJB) operations and a plurality of hash-join-probe (HJP) operations; configuring a decision node of a plurality of decision nodes of the query plan as a primary decision node; decoding by the primary decision node, build-side data information associated with build-side data, the build-side data information received from the plurality of HJB operations; determining by the primary decision node, a data distribution method for each HJB operation of the plurality of HJB operations based on the build-side data information; and causing execution of the query plan based on distributing the build-side data to the plurality of HJP operations using the data distribution method for each HJB operation of the plurality of HJB operations.

In Example 2, the subject matter of Example 1 includes operations such as configuring each decision node of the plurality of decision nodes between a corresponding HJB operation of the plurality of HJB operations and a corresponding HJP operation of the plurality of HJP operations.

In Example 3, the subject matter of Example 2 includes operations such as configuring a subset of the plurality of decision nodes as secondary decision nodes, the subset excluding the primary decision node.

In Example 4, the subject matter of Example 3 includes operations such as generating at least one local decision by at least one of the secondary decision nodes, the at least one local decision indicating the data distribution method for a corresponding portion of the build-side data generated by at least one of the plurality of HJB operations.

In Example 5, the subject matter of Example 4 includes operations such as setting the data distribution method for the corresponding portion of the build-side data as a broadcast join distribution based on the at least one of the plurality of HJB operations being in a single worker fragment.

In Example 6, the subject matter of Examples 4-5 includes operations such as setting the data distribution method for the corresponding portion of the build-side data as a broadcast join distribution based on at least one of the plurality of HJP operations corresponding to the at least one of the plurality of HJB operations being an empty HJP operation.

In Example 7, the subject matter of Examples 4-6 includes operations such as communicating by the at least one of the secondary decision nodes, the at least one local decision to the primary decision node, and determining the data distribution method for each HJB operation of the plurality of HJB operations further based on the at least one local decision.

In Example 8, the subject matter of Examples 1-7 includes operations such as determining an individual memory budget associated with performing a broadcast join distribution as the data distribution method for each HJB operation of the plurality of HJB operations based on the build-side data information.

In Example 9, the subject matter of Example 8 includes operations such as selecting a subset of the plurality of HJB operations based on a collective memory budget including the individual memory budget for each HJB operation of the subset being below a pre-configured threshold.

In Example 10, the subject matter of Example 9 includes operations such as instructing a first subset of the plurality of decision nodes corresponding to the subset of the plurality of HJB operations to perform the broadcast join distribution as the data distribution method for the build-side data information generated by the subset of the plurality of HJB operations; and instructing a second subset of the plurality of decision nodes corresponding to a remaining subset of the plurality of HJB operations to perform a hash-hash join distribution as the data distribution method for the build-side data information generated by the remaining subset of the plurality of HJB operations.

Example 11 is a method comprising: generating, by at least one hardware processor, a query plan for a received query, the query plan comprising a plurality of join operations including a plurality of hash-join-build (HJB) operations and a plurality of hash-join-probe (HJP) operations; configuring a decision node of a plurality of decision nodes of the query plan as a primary decision node; decoding by the primary decision node, build-side data information associated with build-side data, the build-side data information received from the plurality of HJB operations;

determining by the primary decision node, a data distribution method for each HJB operation of the plurality of HJB operations based on the build-side data information; and causing execution of the query plan based on distributing the build-side data to the plurality of HJP operations using the data distribution method for each HJB operation of the plurality of HJB operations.

In Example 12, the subject matter of Example 11 includes configuring each decision node of the plurality of decision nodes between a corresponding HJB operation of the plurality of HJB operations and a corresponding HJP operation of the plurality of HJP operations.

In Example 13, the subject matter of Example 12 includes configuring a subset of the plurality of decision nodes as secondary decision nodes, the subset excluding the primary decision node.

In Example 14, the subject matter of Example 13 includes generating at least one local decision by at least one of the secondary decision nodes, the at least one local decision indicating the data distribution method for a corresponding portion of the build-side data generated by at least one of the plurality of HJB operations.

In Example 15, the subject matter of Example 14 includes setting the data distribution method for the corresponding portion of the build-side data as a broadcast join distribution based on the at least one of the plurality of HJB operations being in a single worker fragment.

In Example 16, the subject matter of Examples 14-15 includes setting the data distribution method for the corresponding portion of the build-side data as a broadcast join distribution based on at least one of the plurality of HJP operations corresponding to the at least one of the plurality of HJB operations being an empty HJP operation.

In Example 17, the subject matter of Examples 14-16 includes communicating, by the at least one of the secondary decision nodes, the at least one local decision to the primary decision node and determining the data distribution method for each HJB operation of the plurality of HJB operations further based on the at least one local decision.

In Example 18, the subject matter of Examples 11-17 includes determining an individual memory budget associated with performing a broadcast join distribution as the data distribution method for each HJB operation of the plurality of HJB operations based on the build-side data information.

In Example 19, the subject matter of Example 18 includes selecting a subset of the plurality of HJB operations based on a collective memory budget, including the individual memory budget for each HJB operation of the subset being below a pre-configured threshold.

In Example 20, the subject matter of Example 19 includes instructing a first subset of the plurality of decision nodes corresponding to the subset of the plurality of HJB operations to perform the broadcast join distribution as the data distribution method for the build-side data information generated by the subset of the plurality of HJB operations; and instructing a second subset of the plurality of decision nodes corresponding to a remaining subset of the plurality of HJB operations to perform a hash-hash join distribution as the data distribution method for the build-side data information generated by the remaining subset of the plurality of HJB operations.

Example 21 is a computer-storage medium comprising instructions that, when executed by one or more processors of a machine, configure the machine to perform operations comprising: generating a query plan for a received query, the query plan comprising a plurality of join operations including a plurality of hash-join-build (HJB) operations and a plurality of hash-join-probe (HJP) operations; configuring a decision node of a plurality of decision nodes of the query plan as a primary decision node; decoding by the primary decision node, build-side data information associated with build-side data, the build-side data information received from the plurality of HJB operations; determining by the primary decision node, a data distribution method for each HJB operation of the plurality of HJB operations based on the build-side data information; and causing execution of the query plan based on distributing the build-side data to the plurality of HJP operations using the data distribution method for each HJB operation of the plurality of HJB operations.

In Example 22, the subject matter of Example 21 includes the operations further comprising configuring each decision node of the plurality of decision nodes between a corresponding HJB operation of the plurality of HJB operations and a corresponding HJP operation of the plurality of HJP operations.

In Example 23, the subject matter of Example 22 includes the operations further comprising configuring a subset of the plurality of decision nodes as secondary decision nodes, the subset excluding the primary decision node.

In Example 24, the subject matter of Example 23 includes the operations further comprising: generating at least one local decision by at least one of the secondary decision nodes, the at least one local decision indicating the data distribution method for a corresponding portion of the build-side data generated by at least one of the plurality of HJB operations.

In Example 25, the subject matter of Example 24 includes the operations further comprising setting the data distribution method for the corresponding portion of the build-side data as a broadcast join distribution based on the at least one of the plurality of HJB operations being in a single worker fragment.

In Example 26, the subject matter of Examples 24-25 includes the operations further comprising setting the data distribution method for the corresponding portion of the build-side data as a broadcast join distribution based on at least one of the plurality of HJP operations corresponding to the at least one of the plurality of HJB operations being an empty HJP operation.

In Example 27, the subject matter of Examples 24-26 includes the operations further comprising: communicating, by the at least one of the secondary decision nodes, the at least one local decision to the primary decision node and determining the data distribution method for each HJB operation of the plurality of HJB operations further based on the at least one local decision.

In Example 28, the subject matter of Examples 21-27 includes the operations further comprising determining an individual memory budget associated with performing a broadcast join distribution as the data distribution method for each HJB operation of the plurality of HJB operations based on the build-side data information.

In Example 29, the subject matter of Example 28 includes the operations further comprising selecting a subset of the plurality of HJB operations based on a collective memory budget, including the individual memory budget for each HJB operation of the subset being below a pre-configured threshold.

In Example 30, the subject matter of Example 29 includes the operations further comprising: instructing a first subset of the plurality of decision nodes corresponding to the subset of the plurality of HJB operations to perform the broadcast join distribution as the data distribution method for the build-side data information generated by the subset of the plurality of HJB operations; and instructing a second subset of the plurality of decision nodes corresponding to a remaining subset of the plurality of HJB operations to perform a hash-hash join distribution as the data distribution method for the build-side data information generated by the remaining subset of the plurality of HJB operations.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   generating a query plan for a received query, the query plan comprising a plurality of join operations including a plurality of hash-join-build (HJB) operations and a plurality of hash-join-probe (HJP) operations;
   configuring a decision node of a plurality of decision nodes of the query plan as a primary decision node;
   decoding by the primary decision node, build-side data information associated with build-side data, the build-side data information received from the plurality of HJB operations;
   selecting by the primary decision node, a data distribution method for each HJB operation of the plurality of HJB operations from a broadcast join distribution and a hash-hash join distribution, the selecting of the data distribution method being based on memory utilization information associated with the build-side data and included in the build-side data information; and
   causing execution of the query plan based on distributing the build-side data to the plurality of HJP operations using the data distribution method for each HJB operation of the plurality of HJB operations.

2. The system of claim 1, the operations comprising: configuring each decision node of the plurality of decision nodes between a corresponding HJB operation of the plurality of HJB operations and a corresponding HJP operation of the plurality of HJP operations.

3. The system of claim 2, the operations comprising: configuring a subset of the plurality of decision nodes as secondary decision nodes, the subset excluding the primary decision node.

4. The system of claim 3, the operations comprising:
generating at least one local decision by at least one of the secondary decision nodes, the at least one local decision indicating the data distribution method for a corresponding portion of the build-side data generated by at least one of the plurality of HJB operations.

5. The system of claim 4, the operations comprising:
setting the data distribution method for the corresponding portion of the build-side data as the broadcast join distribution based on the at least one of the plurality of HJB operations being in a single worker fragment.

6. The system of claim 4, the operations comprising:
setting the data distribution method for the corresponding portion of the build-side data as the broadcast join distribution based on at least one of the plurality of HJP operations corresponding to the at least one of the plurality of HJB operations being an empty HJP operation.

7. The system of claim 4, the operations comprising:
communicating, by the at least one of the secondary decision nodes, the at least one local decision to the primary decision node; and
determining the data distribution method for each HJB operation of the plurality of HJB operations further based on the at least one local decision.

8. The system of claim 1, the operations comprising:
determining an individual memory budget associated with performing a broadcast join distribution as the data distribution method for each HJB operation of the plurality of HJB operations based on the build-side data information.

9. The system of claim 8, the operations comprising:
selecting a subset of the plurality of HJB operations based on a collective memory budget including the individual memory budget for each HJB operation of the subset being below a pre-configured threshold.

10. The system of claim 9, the operations comprising:
instructing a first subset of the plurality of decision nodes corresponding to the subset of the plurality of HJB operations to perform the broadcast join distribution as the data distribution method for the build-side data information generated by the subset of the plurality of HJB operations; and
instructing a second subset of the plurality of decision nodes corresponding to a remaining subset of the plurality of HJB operations to perform a hash-hash join distribution as the data distribution method for the build-side data information generated by the remaining subset of the plurality of HJB operations.

11. A method comprising:
generating, by at least one hardware processor, a query plan for a received query, the query plan comprising a plurality of join operations including a plurality of hash-join-build (HJB) operations and a plurality of hash-join-probe (HJP) operations;
configuring a decision node of a plurality of decision nodes of the query plan as a primary decision node;
decoding by the primary decision node, build-side data information associated with build-side data, the build-side data information received from the plurality of HJB operations;
selecting by the primary decision node, a data distribution method for each HJB operation of the plurality of HJB operations from a broadcast join distribution and a hash-hash join distribution, the selecting of the data distribution method being based on memory utilization information associated with the build-side data and included in the build-side data information; and
causing execution of the query plan based on distributing the build-side data to the plurality of HJP operations using the data distribution method for each HJB operation of the plurality of HJB operations.

12. The method of claim 11, further comprising:
configuring each decision node of the plurality of decision nodes between a corresponding HJB operation of the plurality of HJB operations and a corresponding HJP operation of the plurality of HJP operations.

13. The method of claim 12, further comprising:
configuring a subset of the plurality of decision nodes as secondary decision nodes, the subset excluding the primary decision node.

14. The method of claim 13, further comprising:
generating at least one local decision by at least one of the secondary decision nodes, the at least one local decision indicating the data distribution method for a corresponding portion of the build-side data generated by at least one of the plurality of HJB operations.

15. The method of claim 14, further comprising:
setting the data distribution method for the corresponding portion of the build-side data as the broadcast join distribution based on the at least one of the plurality of HJB operations being in a single worker fragment.

16. The method of claim 14, further comprising:
setting the data distribution method for the corresponding portion of the build-side data as the broadcast join distribution based on at least one of the plurality of HJP operations corresponding to the at least one of the plurality of HJB operations being an empty HJP operation.

17. The method of claim 14, further comprising:
communicating, by the at least one of the secondary decision nodes, the at least one local decision to the primary decision node; and
determining the data distribution method for each HJB operation of the plurality of HJB operations further based on the at least one local decision.

18. The method of claim 11, further comprising:
determining an individual memory budget associated with performing a broadcast join distribution as the data distribution method for each HJB operation of the plurality of HJB operations based on the build-side data information.

19. The method of claim 18, further comprising:
selecting a subset of the plurality of HJB operations based on a collective memory budget including the individual memory budget for each HJB operation of the subset being below a pre-configured threshold.

20. The method of claim 19, further comprising:
instructing a first subset of the plurality of decision nodes corresponding to the subset of the plurality of HJB operations to perform the broadcast join distribution as the data distribution method for the build-side data information generated by the subset of the plurality of HJB operations; and
instructing a second subset of the plurality of decision nodes corresponding to a remaining subset of the plurality of HJB operations to perform a hash-hash join distribution as the data distribution method for the build-side data information generated by the remaining subset of the plurality of HJB operations.

21. A computer-storage medium comprising instructions that, when executed by one or more processors of a machine, configure the machine to perform operations comprising:

generating a query plan for a received query, the query plan comprising a plurality of join operations including a plurality of hash-join-build (HJB) operations and a plurality of hash-join-probe (HJP) operations;

configuring a decision node of a plurality of decision nodes of the query plan as a primary decision node;

decoding by the primary decision node, build-side data information associated with build-side data, the build-side data information received from the plurality of HJB operations;

selecting by the primary decision node, a data distribution method for each HJB operation of the plurality of HJB operations from a broadcast join distribution and a hash-hash join distribution, the selecting of the data distribution method being based on memory utilization information associated with the build-side data and included in the build-side data information; and causing execution of the query plan based on distributing the build-side data to the plurality of HJP operations using the data distribution method for each HJB operation of the plurality of HJB operations.

22. The computer-storage medium of claim 21, the operations further comprising:

configuring each decision node of the plurality of decision nodes between a corresponding HJB operation of the plurality of HJB operations and a corresponding HJP operation of the plurality of HJP operations.

23. The computer-storage medium of claim 22, the operations further comprising:

configuring a subset of the plurality of decision nodes as secondary decision nodes, the subset excluding the primary decision node.

24. The computer-storage medium of claim 23, the operations further comprising:

generating at least one local decision by at least one of the secondary decision nodes, the at least one local decision indicating the data distribution method for a corresponding portion of the build-side data generated by at least one of the plurality of HJB operations.

25. The computer-storage medium of claim 24, the operations further comprising:

setting the data distribution method for the corresponding portion of the build-side data as the broadcast join distribution based on the at least one of the plurality of HJB operations being in a single worker fragment.

26. The computer-storage medium of claim 24, the operations further comprising:

setting the data distribution method for the corresponding portion of the build-side data as the broadcast join distribution based on at least one of the plurality of HJP operations corresponding to the at least one of the plurality of HJB operations being an empty HJP operation.

27. The computer-storage medium of claim 24, the operations further comprising:

communicating, by the at least one of the secondary decision nodes, the at least one local decision to the primary decision node; and determining the data distribution method for each HJB operation of the plurality of HJB operations further based on the at least one local decision.

28. The computer-storage medium of claim 21, the operations further comprising:

determining an individual memory budget associated with performing a broadcast join distribution as the data distribution method for each HJB operation of the plurality of HJB operations based on the build-side data information.

29. The computer-storage medium of claim 28, the operations further comprising:

selecting a subset of the plurality of HJB operations based on a collective memory budget including the individual memory budget for each HJB operation of the subset being below a pre-configured threshold.

30. The computer-storage medium of claim 29, the operations further comprising:

instructing a first subset of the plurality of decision nodes corresponding to the subset of the plurality of HJB operations to perform the broadcast join distribution as the data distribution method for the build-side data information generated by the subset of the plurality of HJB operations; and instructing a second subset of the plurality of decision nodes corresponding to a remaining subset of the plurality of HJB operations to perform a hash-hash join distribution as the data distribution method for the build-side data information generated by the remaining subset of the plurality of HJB operations.

* * * * *